US010337923B2

United States Patent
Siddiqui et al.

(10) Patent No.: US 10,337,923 B2
(45) Date of Patent: Jul. 2, 2019

(54) DIRECTIONAL INTERPOLATION AND CROSS-BAND FILTERING FOR HYPERSPECTRAL IMAGING

(71) Applicant: QUALCOMM Incorporated, San Diego, CA (US)

(72) Inventors: Hasib Siddiqui, San Diego, CA (US); Magdi Mohamed, San Diego, CA (US); James Nash, San Diego, CA (US); Kalin Atanassov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 118 days.

(21) Appl. No.: 15/703,947

(22) Filed: Sep. 13, 2017

(65) Prior Publication Data
US 2019/0078937 A1    Mar. 14, 2019

(51) Int. Cl.
*H04N 9/73*    (2006.01)
*G01J 3/51*    (2006.01)
(Continued)

(52) U.S. Cl.
CPC .............. *G01J 3/51* (2013.01); *G01J 3/0208* (2013.01); *G01J 3/0216* (2013.01); *G01J 3/28* (2013.01);
(Continued)

(58) Field of Classification Search
CPC ....... C01J 3/51; C01J 3/28; C01J 3/524; C01J 3/0208; C01J 3/0216; C01J 2003/2826; C01J 2003/2806; C01J 3/02; H04N 9/73
See application file for complete search history.

(56) References Cited

U.S. PATENT DOCUMENTS 5,568,186 A * 10/1996 Althouse ................... G01J 3/06
                                                    250/332
7,653,240 B1 * 1/2010 Otobe ..................... G06T 3/4015
                                                    382/162
(Continued)

FOREIGN PATENT DOCUMENTS

EP            0729278 A2 *  8/1996    ............. H04N 9/045
WO     WO-2015053111 A1    4/2015
WO     WO-2016041133 A1 *  3/2016    ........... G06T 3/4015

OTHER PUBLICATIONS

Lambrechts A., et al., "A CMOS-Compatible, Integrated Approach to Hyper- and Multispectral Imaging", IEEE, International Electron Devices Meeting (IEDM), Dec. 2014, pp. 261-264.

*Primary Examiner* — David E Harvey
(74) *Attorney, Agent, or Firm* — Paradice & Li LLP

(57) ABSTRACT

Systems and methods are disclosed for processing spectral imaging (SI) data. A training operation estimates reconstruction matrices based on a spectral mosaic of an SI sensor, generates directionally interpolated maximum a-priori (MAP) estimations of image data based on the estimated reconstruction matrices. The training operation may determine filter coefficients for each of a number of cross-band interpolation filters based at least in part on the MAP estimations, and may determine edge classification factors based at least in part on the determined filter coefficients. The training operation may configure a cross-band interpolation circuit based at least in part on the determined filter coefficients and the determined edge classification factors. The configured cross-band interpolation circuit captures mosaic data using the SI sensor, and recovers full-resolution spectral data from the captured mosaic data.

30 Claims, 8 Drawing Sheets

(51) Int. Cl.
*G01J 3/28* (2006.01)
*G01J 3/52* (2006.01)
*G01J 3/02* (2006.01)

(52) U.S. Cl.
CPC ............... *G01J 3/524* (2013.01); *H04N 9/73* (2013.01); *G01J 2003/2826* (2013.01)

(56) References Cited

U.S. PATENT DOCUMENTS

| | | | | |
|---|---|---|---|---|
| 8,131,067 B2* | 3/2012 | Lukac | .................... | H04N 9/045 348/222.1 |
| 8,600,227 B2* | 12/2013 | Xu | ........................ | G03B 11/00 396/544 |
| 9,766,382 B2* | 9/2017 | Darty | .................... | A61B 5/0075 |
| 9,857,222 B2* | 1/2018 | Geelen | ................. | G01J 3/0256 |
| 10,072,970 B1* | 9/2018 | Twede | ................. | G02B 3/0056 |
| 2003/0016882 A1 | 1/2003 | Riley et al. | | |
| 2003/0086606 A1* | 5/2003 | Hunter | .................... | G06T 3/4015 382/167 |
| 2004/0086177 A1* | 5/2004 | Zhang | .................... | H04N 9/045 382/167 |
| 2007/0071362 A1* | 3/2007 | Milanfar | .................. | G06K 9/20 382/299 |
| 2007/0206103 A1* | 9/2007 | Coifman | ................ | H04N 5/332 348/272 |
| 2009/0252411 A1* | 10/2009 | Siddiqui | ................ | G06T 3/4015 382/167 |
| 2010/0013963 A1* | 1/2010 | Jannard | ................ | H04N 5/3675 348/242 |
| 2010/0182466 A1 | 7/2010 | Chang et al. | | |
| 2011/0032269 A1* | 2/2011 | Lukac | .................... | G06T 3/4015 345/606 |
| 2011/0050918 A1* | 3/2011 | Tachi | ..................... | H04N 5/217 348/208.4 |
| 2012/0105671 A1* | 5/2012 | Taniguchi | .............. | H04N 9/045 348/224.1 |
| 2012/0327248 A1* | 12/2012 | Tack | ......................... | G01J 3/26 348/164 |
| 2013/0279805 A1 | 10/2013 | Zillman et al. | | |
| 2013/0293702 A1 | 11/2013 | Xin et al. | | |
| 2015/0103212 A1* | 4/2015 | Saito | ..................... | H04N 9/045 348/242 |
| 2017/0161873 A1* | 6/2017 | Dabral | .................. | G06T 3/4015 |
| 2017/0205337 A1* | 7/2017 | Akhtman | .............. | G01J 3/2823 |
| 2018/0224332 A1* | 8/2018 | Ooi | ............................ | G01J 3/26 |

* cited by examiner

Figure 4

DIRECTIONAL INTERPOLATION AND CROSS-BAND FILTERING FOR HYPERSPECTRAL IMAGING

TECHNICAL FIELD

Aspects of the present disclosure relate generally to digital optics, and more specifically to hyperspectral imaging (HSI).

BACKGROUND OF RELATED ART

Hyperspectral imaging (HSI) sensors may sense electromagnetic radiation in a plurality of spectral bands that typically extend outside of (e.g., beyond) the visible spectrum. HSI sensors may be used in a variety of applications including, for example, robotics, computer vision, medical imaging, agriculture, surveillance, and minerology. Advances in digital micro-optics have led to the miniaturization of HSI sensors while also increasing spectral resolution, thereby allowing smaller HSI sensors to capture image data spanning greater numbers of spectral bands. Decreasing the physical dimensions of an HSI sensor may reduce its spatial resolution, which in turn may reduce the HSI sensor's ability to capture high-frequency image features. Thus, there may be an undesirable trade-off between spectral resolution and spatial resolution, particularly for miniatured HSI sensors.

SUMMARY

This Summary is provided to introduce in a simplified form a selection of concepts that are further described below with respect to the Detailed Description. This Summary is not intended to identify key features or essential features of the claimed subject matter, nor is it intended to limit the scope of the claimed subject matter.

Apparatuses and methods are disclosed that may allow for spectral imaging (SI) data to be processed. In one example, a method for processing SI data is disclosed. The method may include determining a spectral mosaic of a spectral imaging (SI) sensor; estimating a number of reconstruction matrices based on the spectral mosaic of the SI sensor; generating a number of directionally interpolated maximum a-priori (MAP) estimations of image data based on the number of estimated reconstruction matrices; determining filter coefficients for each of a number of cross-band interpolation filters based at least in part on the MAP estimations of the image data; determining edge classification factors for pixels of the SI sensor based at least in part on the determined filter coefficients; and configuring a cross-band interpolation circuit based at least in part on the determined filter coefficients and the determined edge classification factors. In some aspects, the method may also include capturing SI mosaic data using the SI sensor, and recovering full-resolution spectral data from the captured SI mosaic data using the configured cross-band interpolation circuit.

In another example, a device is disclosed. The device may include memory configured to store data, and a processor in communication with the memory. The processor may be configured to determine a spectral mosaic of a spectral imaging (SI) sensor; estimate a number of reconstruction matrices based on the spectral mosaic of the SI sensor; generate a number of directionally interpolated maximum a-priori (MAP) estimations of image data based on the number of estimated reconstruction matrices; determine filter coefficients for each of a number of cross-band interpolation filters based at least in part on the MAP estimations of the image data; determine edge classification factors for pixels of the SI sensor based at least in part on the determined filter coefficients; and configure a cross-band interpolation circuit based at least in part on the determined filter coefficients and the determined edge classification factors. In some aspects, the processor may further be configured to capture SI mosaic data using the SI sensor, and to recover full-resolution spectral data from the captured SI mosaic data.

In another example, a device is disclosed. The device may include means for determining a spectral mosaic of a spectral imaging (SI) sensor; means for estimating a number of reconstruction matrices based on the spectral mosaic of the SI sensor; means for generating a number of directionally interpolated maximum a-priori (MAP) estimations of image data based on the number of estimated reconstruction matrices; means for determining filter coefficients for each of a number of cross-band interpolation filters based at least in part on the MAP estimations of the image data; means for determining edge classification factors for pixels of the SI sensor based at least in part on the determined filter coefficients; and means for configuring a cross-band interpolation circuit based at least in part on the determined filter coefficients and the determined edge classification factors. In some aspects, the device may also include means for capturing SI mosaic data using the SI sensor, and means for recovering full-resolution spectral data from the captured SI mosaic data.

In another example, a device is disclosed. The device may include a spectral imaging (SI) sensor configured to capture SI mosaic data, a set of first directional cross-band interpolation filters, a set of second directional cross-band interpolation filters, first and second scalers, and a summing node. The set of first directional cross-band interpolation filters may be configured to generate a number of first interpolated images based at least in part on an edge energy along a first direction of the captured SI mosaic data, each of the first directional interpolated images corresponding to a different spectral band of the SI sensor. The set of second directional cross-band interpolation filters may be configured to generate a number of second directional interpolated images based at least in part on an edge energy along a second direction of the captured SI mosaic data that is orthogonal to the first direction, each of the second directional interpolated images corresponding to a different spectral band of the SI sensor. The first scaler may be configured to scale the number of first interpolated images based on a first edge classification factor, and the second scaler may be configured to scale the number of second interpolated images based on a second edge classification factor. The summing node may be configured to generate full-resolution image data based on a combination of the scaled first interpolated images and the scaled second interpolated images.

BRIEF DESCRIPTION OF THE DRAWINGS

Aspects of the present disclosure are illustrated by way of example and are not intended to be limited by the figures of the accompanying drawings.

FIG. 4 shows an example reconstruction matrix having a block circulant structure.

Like reference numerals refer to corresponding parts throughout the drawing figures.

DETAILED DESCRIPTION

Figure 1:
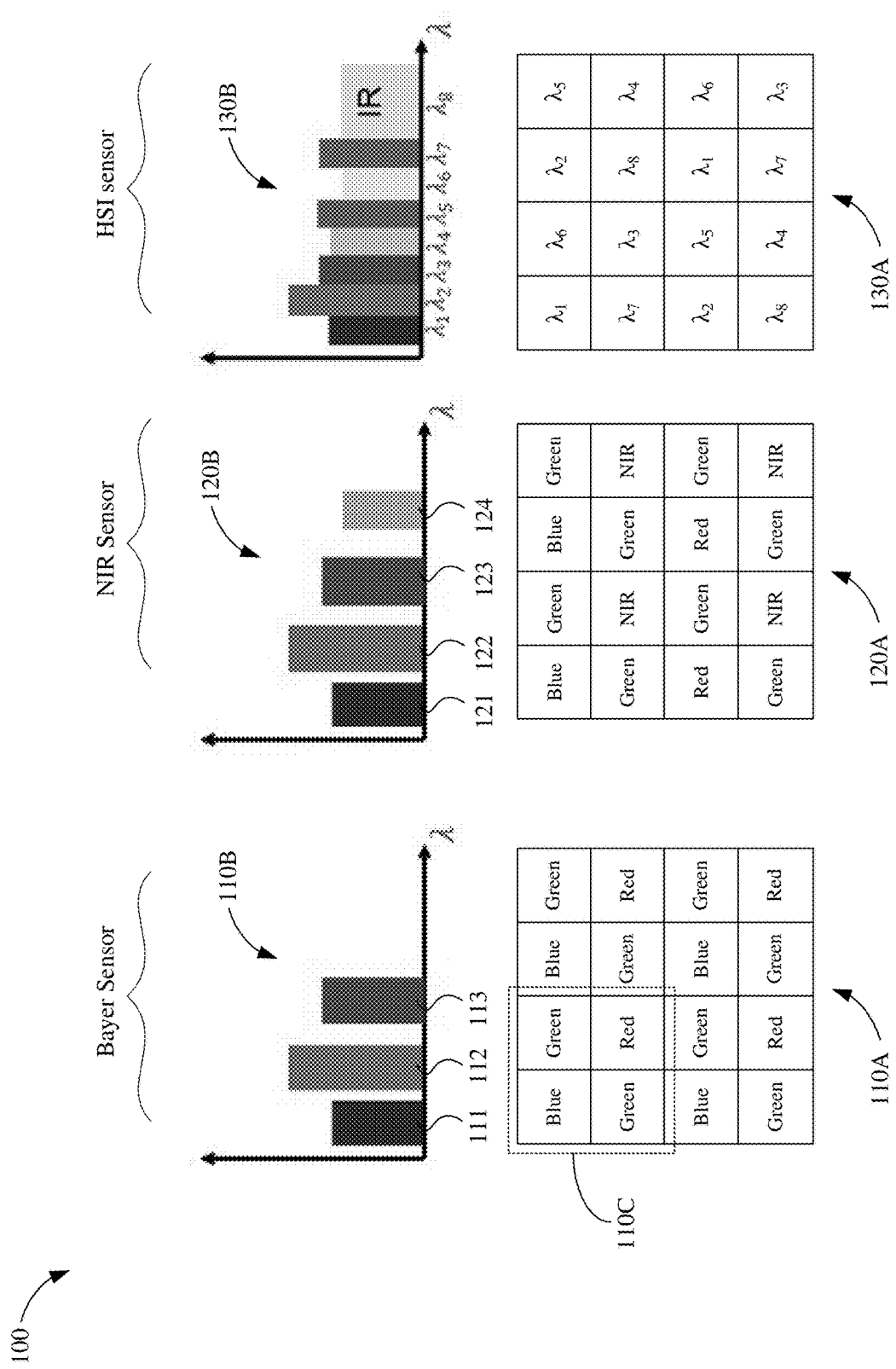
FIG. 1 shows an illustration depicting a comparison of spectral mosaics and corresponding spectral bands for a Bayer sensor, a near infrared (NIR) sensor, and an HSI sensor.

Interpolation techniques used to recover full-resolution spectral data from raw image data captured by an HSI sensor may vary depending on the spectral resolution of the HSI sensor. For example, an interpolation technique configured to process raw image data from a first HSI sensor having a first spectral resolution may be less efficient (or even unsuitable) for processing raw image data from a second HSI sensor having a second spectral resolution that is different than the first spectral resolution. Thus, as the spectral resolution of an HSI sensor increases, the efficiency with which a given interpolation technique may recover full-resolution spectral data from all spectral bands of the HSI sensor may decrease.

Thus, it would be desirable to efficiently process image data having a variety of spectral resolutions while preserving the spatial resolution of HSI sensors.

Aspects of the present disclosure may be used to recover full-resolution spectral data from raw image data captured by HSI sensors while preserving the spatial resolution of the HSI sensors. In some implementations, an HSI sensor may capture raw image data as HSI mosaic data. The HSI mosaic data, which may have a relatively low spatial resolution, may be provided to a number of cross-band interpolation filters that interpolate the HSI mosaic data into images associated with a number of interpolated spectral bands. In some aspects, the cross-band interpolation filters may use directional interpolation techniques to preserve the spatial structure of the HSI mosaic data, for example, by processing the HSI mosaic data in orthogonal directions.

In some implementations, a training operation may determine filter coefficients for the cross-band interpolation filters based on the spectral mosaic of an associated HSI sensor. The training operation may be performed prior to image captures by the associated HSI sensor, and may be performed for HSI sensors having different spectral mosaics. In some aspects, the training operation may determine one or more reconstruction matrices based on the spectral mosaic of the associated HSI sensor. The one or more reconstruction matrices may be used to determine the filter coefficients of the cross-band interpolation filters, such that the filter coefficients may be used to map the raw image data to a number of directionally interpolated images corresponding to the spectral bands of the HSI sensor.

In the following description, numerous specific details are set forth such as examples of specific components, circuits, and processes to provide a thorough understanding of the present disclosure. The term "coupled" as used herein means connected directly to, connected through one or more intervening components or circuits, or in communication with (e.g., "communicatively coupled"). As used herein, the terms "spectral band" and "spectral channel" may refer to a range of frequencies associated with a specific color or a specific non-visible spectrum, and thus the terms "spectral band" and "spectral channel" may be used interchangeably. Also, in the following description and for purposes of explanation, specific nomenclature is set forth to provide a thorough understanding of the example implementations disclosed herein. However, it will be apparent to one skilled in the art that these specific details may not be required to practice the example implementations. In other instances, well-known circuits and devices are shown in block diagram form to avoid obscuring the present disclosure. The example implementations are not to be construed as limited to specific examples described herein but rather to include within their scopes all implementations defined by the appended claims.

Further, while the following description refers to implementations which may process hyperspectral imaging (HSI) data captured by an HSI sensor, the example implementations may also be applicable to implementations which may process spectral imaging (SI) data captured by a variety of SI sensors. For example, while multispectral imaging data and ultra-spectral imaging data may include differing numbers of spectral bands, and may include data from spectral bands having differing bandwidths, such data may also be processed by example implementations without departing from the scope of this disclosure.

FIG. 1 shows an illustration 100 depicting a comparison of three example spectral mosaics 110A, 110B, and 110C. The spectral mosaic 110A, which may correspond to a 16-pixel Bayer sensor, is shown to cover a number q=3 of spectral bands and includes four identical 2×2 RGB (red-green-blue) patterns 110C. A spectral map 110B depicts the spectral locations for the blue band 111, the green band 112, and the red band 113 of the spectral mosaic 110A. The spectral mosaic 120A, which may correspond to a 16-pixel near infrared (NIR) sensor, is shown to cover a number q=4 of spectral bands and includes a 4×4 RGB-NIR (red-green-blue near-infrared) pattern. A spectral map 120B depicts the spectral locations for the blue band 121, the green band 122, the red band 123, and the near-infrared band 124 of the spectral mosaic 120A. The spectral mosaic 130A, which may correspond to a 16-pixel HSI sensor, is shown to cover a number q=8 of spectral bands and includes a 4×4 spectral pattern. A spectral map 130B depicts the spectral locations of 8 bands ($\lambda_1$-$\lambda_8$) of the spectral mosaic 130A, for example, where $\lambda_1$ corresponds to the blue band, $\lambda_2$ corresponds to the green band, $\lambda_3$ corresponds to the red band, $\lambda_4$-$\lambda_7$ correspond to other colors in the visible spectrum, and $\lambda_8$ corresponds to the infrared (IR) band.

Because imaging sensors typically have a fixed number of pixels with which to capture spectral image data, increasing the number of spectral bands to be captured by a given imaging sensor decreases the number of pixels that can be devoted to (e.g., associated or configured for use with) each of the spectral bands. As a result, there may be an undesirable trade-off between the spectral resolution and the spatial resolution of a given imaging sensor. For example, referring to FIG. 1, the Bayer sensor has a lower spectral resolution than the NIR sensor, which has a lower spectral resolution than the HSI sensor (e.g., as indicated by the spectral maps 110B, 120B, and 130B, respectively). However, while the Bayer sensor may devote (e.g., utilize) 4 pixels to/for each of the blue, green, and red bands, the NIR sensor may devote 4 pixels to the blue band but only 2 pixels to each of the green and red bands, and the HSI sensor may devote only 2 pixels to each of the blue, green, and red bands (e.g., as indicated by the spectral mosaics 110A, 120A, and 130A, respectively). Thus, the Bayer sensor has a greater spatial resolution than the NIR sensor, which has a greater spatial resolution than the HSI sensor. In other words, although the 16-pixel HSI sensor may capture more spectral bands than either the 16-pixel Bayer sensor or the 16-pixel NIR sensor, the spatial resolution of image data captured by the 16-pixel HSI sensor may be less than the spatial resolution of image data captured by the 16-pixel NIR sensor, and the spatial resolution of image data captured by the 16-pixel NIR sensor may be less than the spatial resolution of image data captured by the 16-pixel Bayer sensor.

Figure 2:
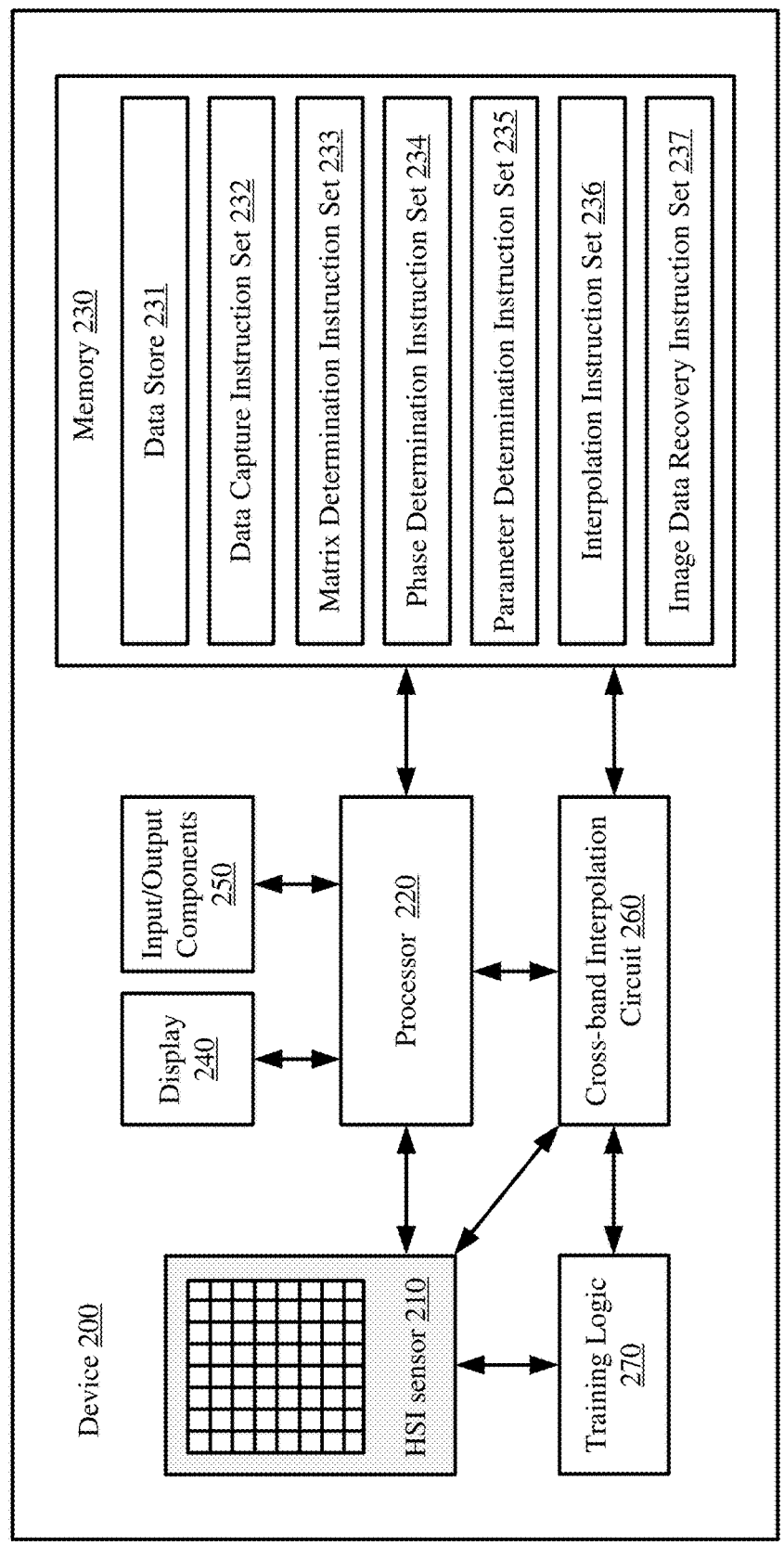
FIG. 2 shows an example device that may process HSI data.

FIG. 2 shows an example device 200 that may process HSI data in accordance with the present disclosure. The device 200 may be any suitable device capable of capturing images or video including, for example, wired and wireless communication devices (such as camera phones, smartphones, tablets, security systems, dash cameras, laptop computers, desktop computers, and so on), digital cameras (including still cameras, video cameras, and so on), or any other suitable device. The device 200 may include at least an HSI sensor 210, a processor 220, a memory 230, a display 240, a number of input/output (I/O) components 250, and a cross-band interpolation circuit 260.

The device 200 may include additional features or components not shown. For example, a wireless interface, which may include a number of transceivers and a baseband processor, may be included for a wireless communication device. The device 200 may also include additional sensors or cameras not shown in the example of FIG. 2. Aspects of the present disclosure are not to be limited to any specific examples or illustrations described herein, including the example device 200.

In some aspects, the HSI sensor 210 may have a specific spectral mosaic. In other aspects, the HSI sensor 210 may have, or may be configured to have, a number of different spectral mosaics. In some other aspects, the HSI sensor 210 may be any other one or more suitable imaging sensors. Although the HSI sensor 210 is shown in the example of FIG. 2 as integrated within the device 200, in other implementations, the HSI sensor 210 may be external to the device 200, for example, and coupled to the device 200 via one or more mechanisms such as cables (not shown for simplicity).

The display 240 may be any suitable display or screen that presents (e.g., displays) data and other items (such as captured images and video) for viewing by a user. In some aspects, the display 240 may be a touch-sensitive display that allows for user input or user commands. The I/O components 250 may be or include any suitable mechanism, interface, or device to receive input (such as commands) from the user and to provide output to the user. For example, the I/O components 250 may include (but are not limited to) a graphical user interface, a keyboard, a mouse, a microphone, speakers, and so on.

The memory 230 may include a data store 231. The data store 231 may store image data such as, for example, raw image data captured by the HSI sensor 210 and full-resolution image data recovered from the raw image data. The data store 231 may also store matrices, spectral band estimates, and interpolation parameters used to recover full-resolution image data from the raw image data. The stored matrices may include one or more reconstruction matrices from which a number of filter coefficients may be derived or determined. The stored spectral band estimates may include a number of directionally interpolated MAP estimates of spectral bands associated with the HSI sensor 210. The stored interpolation parameters may include filter coefficients for a number of cross-band interpolation filters, a number of edge classification parameters, and any other suitable configuration data, coefficients, and/or parameters that may be used to enhance the spatial resolution of image data captured or provided by the HSI sensor 210.

Figure 7:
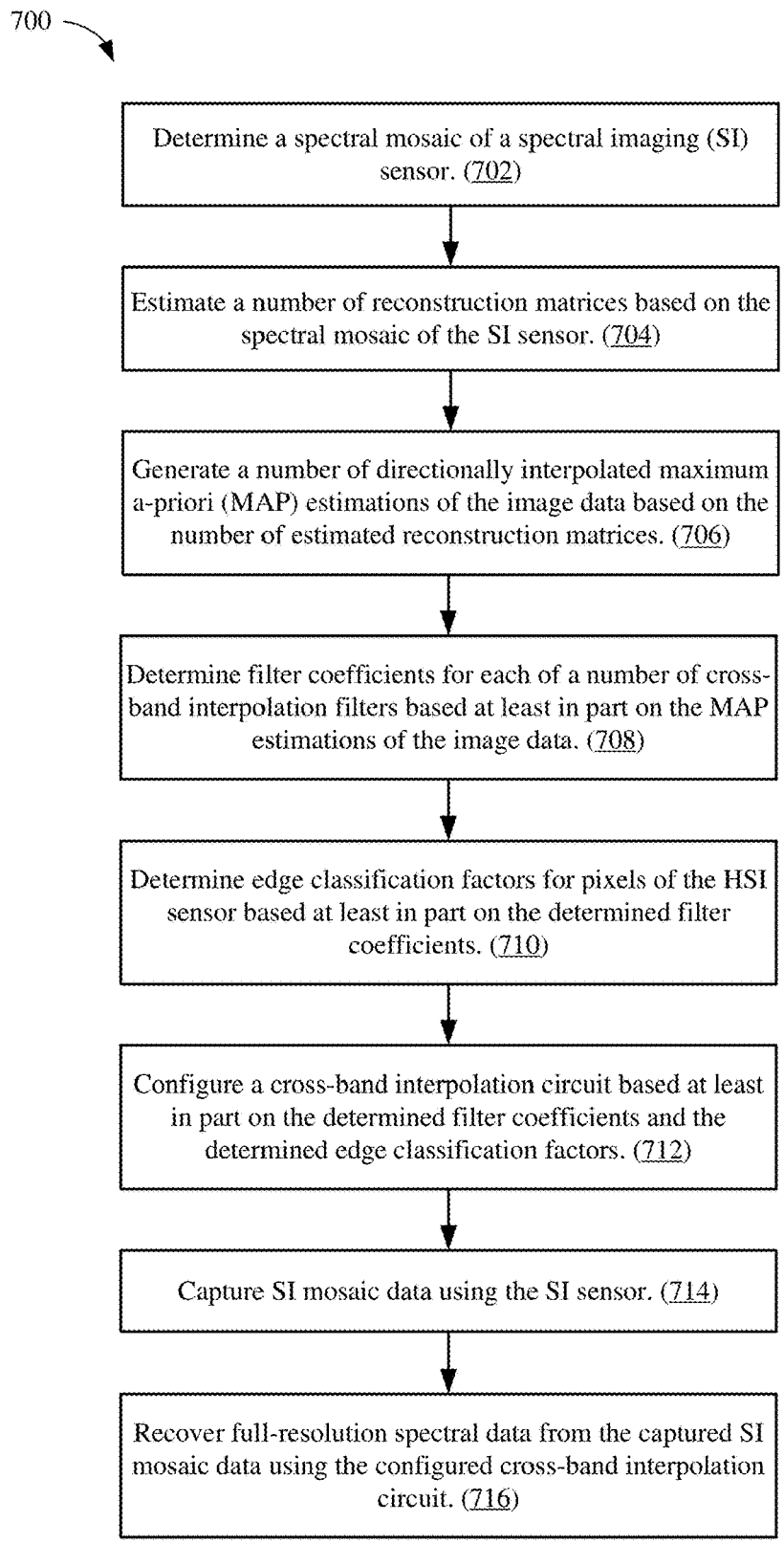
FIG. 7 shows an illustrative flow chart depicting an example operation for processing SI data.
Figure 8:
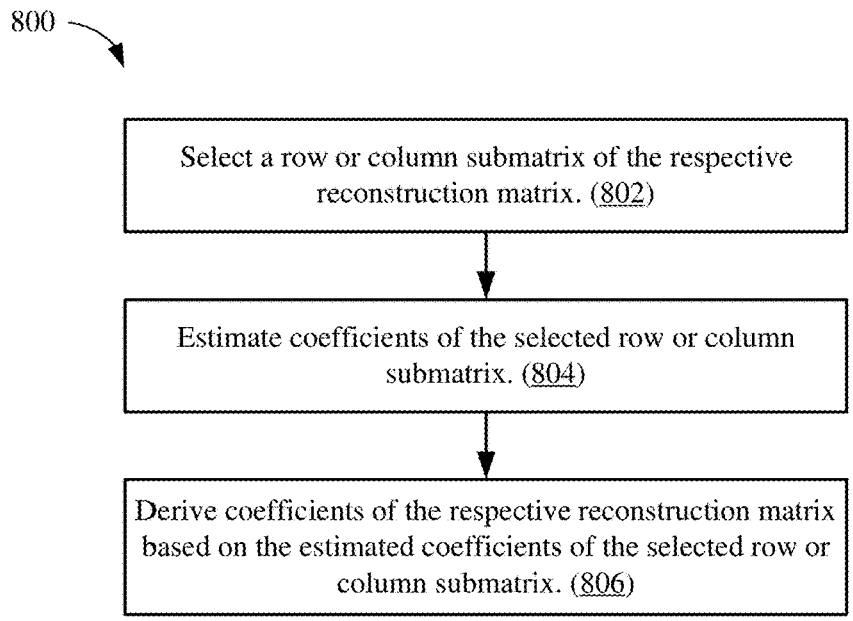
FIG. 8 shows an illustrative flow chart depicting an example operation for estimating a reconstruction matrix having a block circulant structure.
Figure 9:
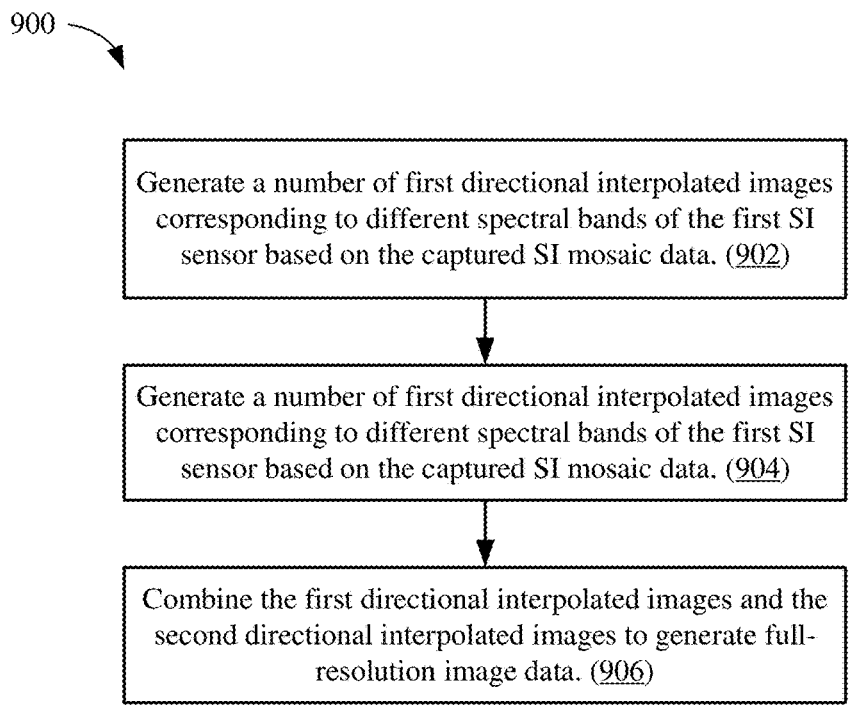
FIG. 9 shows an illustrative flow chart depicting an example operation for recovering full-resolution spectral data from captured SI mosaic data.

The memory 230 may also include a non-transitory computer-readable storage medium (e.g., one or more nonvolatile memory elements, such as EPROM, EEPROM, Flash memory, a hard drive, and so on) that may store at least the following instruction sets:

a data capture instruction set 232 to facilitate the capture of raw image data from the HSI sensor 210 (e.g., as described for one or more operations of FIGS. 7-9);

a matrix determination instruction set 233 to facilitate the determination of one or more reconstruction matrices for the HSI sensor 210 (e.g., as described for one or more operations of FIGS. 7-9);

a phase determination instruction set 234 to facilitate the determination of pixel phase information of mosaic image data provided by the HSI sensor 210 (e.g., as described for one or more operations of FIGS. 7-9);

a parameter determination instruction set 235 to facilitate the determination of filter coefficients for a number of cross-band interpolation filters and to facilitate the determination of edge classification factors for pixels associated with the mosaic image data provided by the HSI sensor 210 (e.g., as described for one or more operations of FIGS. 7-9);

an interpolation instruction set 236 to facilitate the determination of interpolated images for each spectral band of the HSI sensor 210 (e.g., as described for one or more operations of FIGS. 7-9); and an image data recovery instruction set 237 to facilitate the recovery of full-resolution image data from the raw image data captured or provided by the HSI sensor 210 (e.g., as described for one or more operations of FIGS. 7-9).

Each instruction set includes a number of instructions or commands that, when executed by the processor 220, causes the device 200 to perform the corresponding functions. In some aspects, each of the instruction sets may be implemented as one or more software modules or programs. The non-transitory computer-readable medium of the memory 230 thus includes instructions or programs for performing all or a portion of the operations described below with respect to FIGS. 7-9.

The processor 220 may be any suitable one or more processors capable of executing scripts, commands, instructions, or software programs stored in the device 200 (e.g., within the memory 230). In some aspects, the processor 220 may be one or more general purpose processors that execute scripts, commands, instructions, or software programs stored in the memory 230 to cause the device 200 to perform a number of functions or operations. In addition, or in the alternative, the processor 220 may include integrated circuits or other hardware to perform the number of functions or operations without the use of software. Although depicted as being coupled to each other via the processor 220 in the example of FIG. 2, the processor 220, the memory 230, the display 240, the I/O components 250, and the cross-band interpolation circuit 260 may be coupled to one another in various arrangements or configurations. For example, the processor 220, the memory 230, the display 240, the I/O components 250, and the cross-band interpolation circuit 260 may be coupled to each other via one or more local buses (not shown for simplicity).

The processor 220 may execute the data capture instruction set 232 to facilitate the capture of raw image data from the HSI sensor 210. The processor 220 may execute the matrix determination instruction set 233 to facilitate the determination of one or more reconstruction matrices for the HSI sensor 210. The processor 220 may execute the phase determination instruction set 234 to facilitate the determination of pixel phase information of mosaic image data provided by the HSI sensor 210. The processor 220 may execute the parameter determination instruction set 235 to facilitate the determination of filter coefficients for a number of cross-band interpolation filters and to facilitate the determination of edge classification factors for pixels associated with the mosaic image data provided by the HSI sensor 210. The processor 220 may execute the interpolation instruction set 236 to facilitate the determination of interpolated images for each spectral band of the HSI sensor 210. The processor 220 may execute the image data recovery instruction set 237 to facilitate the recovery of full-resolution image data from the raw image data captured or provided by the HSI sensor 210.

The cross-band interpolation circuit 260 may be or include any suitable hardware components that can perform the functions and operations associated with at least the phase determination instruction set 234, the interpolation instruction set 236, and the data recovery instruction set 237. In some aspects, the cross-band interpolation circuit 260 may be dynamically configurable, for example, by retrieving filter coefficients, reconstruction matrix information, edge classification factors, and other configuration information from the memory 230 (e.g., from the data store 231). Although not shown in FIG. 2 for simplicity, the cross-band interpolation circuit 260 may include at least a phase determination circuit, an edge classifier, and a number of cross-band interpolation filters. The phase determination circuit may determine the phases of pixels in mosaic data received from the HSI sensor 210. The edge classifier may determine edge classification factors for the pixels in mosaic data received from the HSI sensor 210. The cross-band interpolation filters may process mosaic data received from the HSI sensor 210 to determine or generate a number of directionally interpolated images. The directionally interpolated images, which may correspond to different spectral bands of the HSI sensor 210, may be used to recover full-resolution image data from raw image data (e.g., mosaic data) captured or provided by the HSI sensor 210.

In some implementations, the cross-band interpolation circuit 260 may include a set of first directional cross-band interpolation filters and a set of second directional cross-band interpolation filters. The set of first directional cross-band interpolation filters may be configured to generate a number of first interpolated images based on the captured HSI mosaic data. Each of the first directional interpolated images may correspond to a different spectral band of the HSI sensor, and may be associated with an edge energy along a first direction of the HSI mosaic data. The set of second directional cross-band interpolation filters may be configured to generate a number of second directional interpolated images based on the captured HSI mosaic data. Each of the second directional interpolated images may correspond to a different spectral band of the HSI sensor, and may be associated with an edge energy along a second direction of the HSI mosaic data that is orthogonal to the first direction. In some aspects, the first direction may be a horizontal direction of the HSI mosaic data, and the second direction may be a vertical direction of the HSI mosaic data.

The device 200 may also include training logic 270 coupled to the HSI sensor 210 and the cross-band interpolation circuit 260. The training logic 270 may perform a training operation to determine a set of optimum spectral interpolation parameters and filter coefficients for processing image data captured by the HSI sensor 210. The set of optimum spectral interpolation parameters and filter coefficients may be based on the spectral mosaic of the HSI sensor 210, and may be used to configure the device 200 (e.g., the cross-band interpolation circuit 260) in a manner that not only maximizes the efficiency with which HSI data can be processed by the device 200 but that also maximizes spectral resolution while preserving spatial resolution. The training operation may be performed for each sensor pattern of the HSI sensor 210. In some aspects, the training operation may be performed prior to (and independent of) image capturing by the HSI sensor 210. In addition, or in the alternative, the training operation may be used to reconfigure the device 200, for example, if the device 200 was previously configured based on other sensor patterns (e.g., based on different sensor patterns associated with sensors other than the HSI sensor 210). In some aspects, the training logic 270 may be or include any suitable hardware components that can perform the functions and operations associated with at least the matrix determination instruction set 233, the phase determination instruction set 234, and the parameter determination instruction set 235.

The HSI sensor 210 may include a number of rectangular pixels arranged as a 2-dimensional pixel grid, and may include a number of spectral data channels. In some aspects, each of the spectral data channels may correspond to one of the spectral bands that can be captured by the HSI sensor 210. The pixel grid may be a mosaic pattern including a number of identical pixel blocks. The number of identical pixel blocks within the mosaic pattern may be referred to as the periodicity of the HSI sensor 210. In some implementations, the pixel grid may be arranged as an N×N array having a number of identical p×p pixel blocks, where N and p are integers greater than 1. In some aspects, the value of N is an integer multiple of the value of p.

Referring again to FIG. 1, the spectral mosaic 110A corresponding to the 16-pixel Bayer sensor is a 4×4 pixel grid including four identical 2×2 pixel blocks 110C, and thus the 16-pixel Bayer sensor has a value of N=4, has a value of p=2, has a value q=3, and has a periodicity equal to four. The spectral mosaic 120A corresponding to the 16-pixel NIR sensor is a 4×4 pixel grid including a single 4×4 pixel block, and thus the 16-pixel NIR sensor has a value of N=4, has a value of p=4, has a value q=4, and has a periodicity equal to one. The spectral mosaic 130A corresponding to the 16-pixel HSI sensor is a 4×4 pixel grid including a single 4×4 pixel block, and thus the 16-pixel HSI sensor has a value of N=4, has a value of p=4, has a value q=8, and has a periodicity equal to one.

Figure 3:
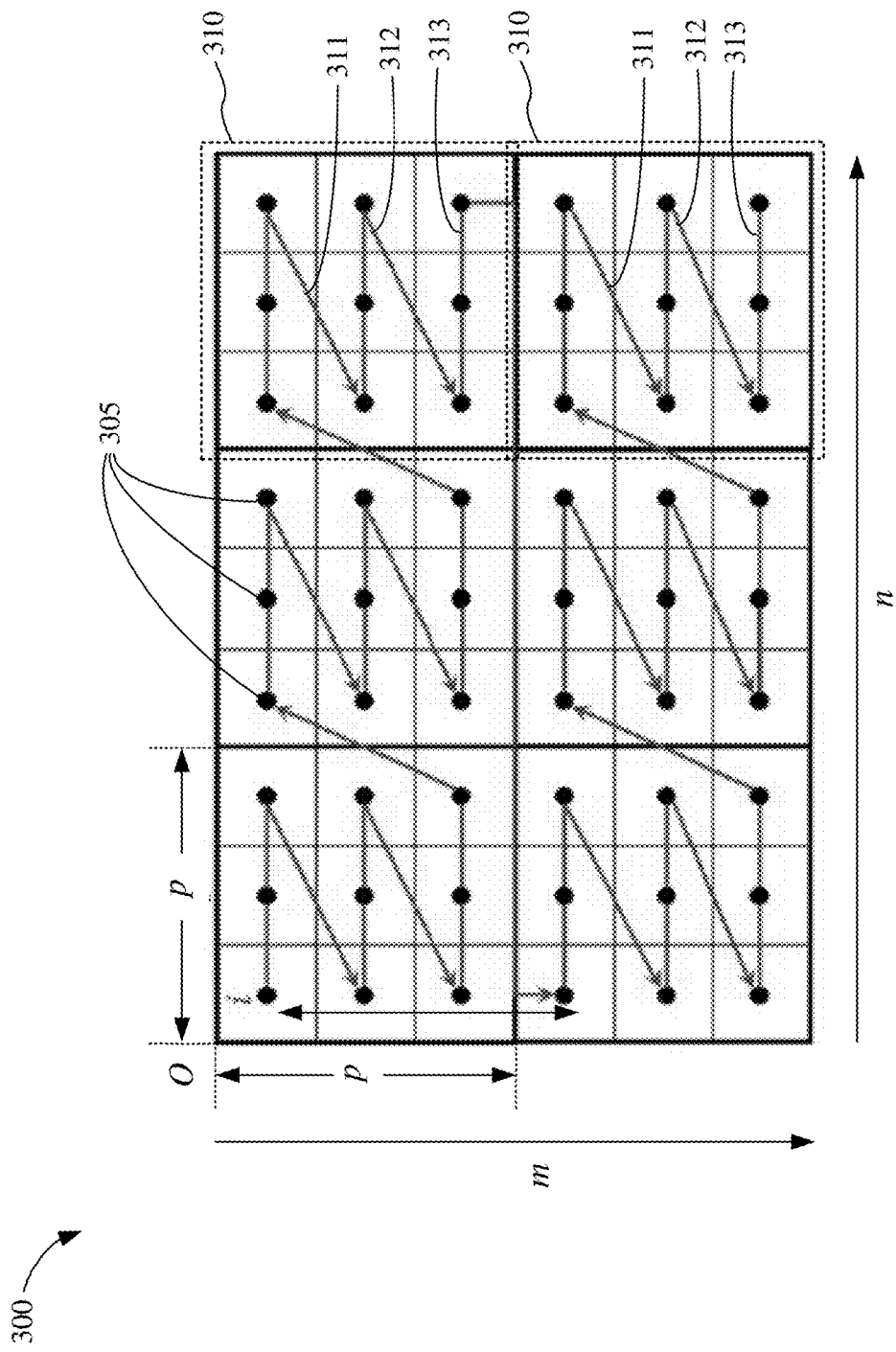
FIG. 3 shows an example pixel grid of an HSI sensor.

FIG. 3 shows an example pixel grid 300. In some aspects, the pixel grid 300 may represent a portion or all of the spectral mosaic of the HSI sensor 210 of FIG. 2. The pixel grid 300, which may include any number of pixels 305, is arranged as an m×n array including six 3×3 pixel blocks 310. Thus, the example pixel grid 300 of FIG. 3 has a value of p=3 and a periodicity equal to six. A number of sets of arrows 311-313 illustrate an example vectorial ordering of the pixels 305 of the pixel grid 300. In other aspects, the pixel grid 300 may include other numbers of pixels, may represent a portion or all of the spectral mosaic of another suitable imaging sensor, and/or may have other suitable vectorial orderings of pixels.

For the example pixel grid 300, the observed value of a spectral sample of a pixel 305 having a vectorial location (i) on the pixel grid 300 may be denoted as $y_i$. In some implementations, the vectorial location i of the pixel 305 may be expressed as a function of its 2-dimensional spatial location (m,n) in the pixel grid 300, as indicated below:

$$i = pm \bmod p^2 + \left\lfloor \frac{m}{p} \right\rfloor pN + n,$$

$$i \in \{0, \cdots, N^2-1\} \text{ and } m, n \in \{0 \cdots, N-1\}$$

The phase $\varphi$ of the pixel 305 at vectorial location i of the pixel grid 300 may be defined as one of $p^2$ possible locations in one period or instance (e.g., within one of the pixel blocks 310) of the pixel grid 300, as indicated below:

$$\varphi = i \bmod p^2, \text{ and } \varphi \in \{0, 1, \ldots, p^2-1\}.$$

Intensity values for one period of a spectral mosaic having a top-left corner pixel 305 positioned at vectorial location i may be stacked into a $p^2$ dimensional column vector $y_i$:

$$y_i \triangleq [y_{ip^2}, \ldots y_{(i+1)p^2-1}]^T,$$

$$y_i \in \mathbb{R}^{p^2}$$

Block intensity column vectors may be vertically concatenated in raster scan order (such as indicated by the sets of arrows 311-313) to form an $N^2$ dimensional HSI observation vector $y$, as indicated below:

$$y \triangleq [y_0^T, y_1^T, \ldots y_{(N/p)^2-1}^T]^T = [y_0, y_1, \ldots y_{N^2-1}]^T$$

$$y \in \mathbb{R}^{N^2}$$

The equations discussed above assume that the value of N is an integer multiple of the value of $\mu$. In some other implementations, the value of N may not be an integer multiple of the value of p.

The unknown q-dimensional spectral vector to be estimated at pixel location i may be expressed as:

$$x_i = [x_i^0, x_i^1, \ldots, x_i^{q-1}]^T, x_i \in \mathbb{R}^q$$

where $x^j$ indicates the $j^{th}$ spectral band, and q is the total number of spectral bands or channels in the image represented by the pixel grid 310.

The spectral vectors $x_i$ may be collected for one period of the spectral mosaic, wherein the top-left corner of the 3×3 pixel block 310 is the pixel 305 at location i. The resulting collection of spectral vectors $x_i$ may be expressed as:

$$\mathcal{X}_i \triangleq [x_{iqp^2}, x_{iqp^2+1}, \ldots x_{(i+1)qp^2-1}]^T, x_i \in \mathbb{R}^{qp^2}$$

and the full-resolution spectral image x (e.g., having q spectral bands) to be determined may be expressed by a vertical concatenation of the spectral vectors $\mathcal{X}_i$, where:

$$x \triangleq \left[ \mathcal{X}_0^T, \mathcal{X}_1^T, \cdots, \mathcal{X}_{(N/p)^2-1}^T \right]^T$$

$$= \left[ x_0, x_1, \cdots, x_{qN^2-1} \right]^T \in \mathbb{R}^{qN^2}$$

For raw image data $y_i$ (e.g., captured by the HSI sensor 210), the observed data of the pixel 305 at location i may be expressed as a linear combination of the spectral values $x_i^j$, such that:

$$y_i = \sum_{j=0}^{q-1} a_i^j x_i^j = a_i^T x_i$$

In some aspects, the term $a_i$ may be a q-dimensional unit impulse vector which selects one of the q spectral bands that can be captured by an associated HSI sensor (e.g., the HSI sensor 210 of FIG. 2). For example, the value of $a_1$ for the spectral mosaic 130A of FIG. 1 is an 8-dimensional unit vector having a "1" in the dimension corresponding to $\lambda_1$. In other aspects, the value of $a_i$ may include multiple non-negative real entries. In this manner, a device (such as the device 200 of FIG. 2) may sample raw image data represented by a spectral mosaic as a matrix-vector multiplication, for example, such that:

$$y_i = A_b \mathcal{X}_i, \text{ where } A_b \in \mathbb{R}^{p^2 \times qp^2}.$$

As an example, for the unit block 110C of the Bayer sensor mosaic 110A of FIG. 1, $A_b$ may be given as $$A_b = \begin{bmatrix} 0 & 0 & 1 & 0 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 1 & 0 & 0 \end{bmatrix}$$

The linear spectral compression operator A, which maps the entire unknown image x to the raw image data y, may be represented as $N^2/p^2$ copies of $A_b$ placed on the diagonal of a large matrix. In some implementations, the linear spectral compression operator A may be expressed as:

$$A \triangleq I_{N^2/p^2} \otimes A_b$$

where $\otimes$ is the tensor product and $I_s$ is an s×s identity matrix. In some aspects, the linear spectral compression operator A may be an $N^2 \times qN^2$ block diagonal matrix having a diagonal that includes $p^2 \times qp^2$ blocks. For purposes of discussion herein, the value of $N^2/p^2$ is assumed to be an integer. In other aspects, the value of $N^2/p^2$ may not be an integer.

The value of $y$, may include noise, which may be expressed as $n \in \mathbb{R}^{N^2}$. In some aspects, the noise may be modeled as additive, zero-mean Gaussian noise having a covariance matrix expressed as $\Lambda = \sigma^2 1_{N^2}$ such that y=Ax+n. Thus, the probability density function of the observed raw image data y given the full-resolution spectral image x may be expressed as:

$$p(y \mid x) = \frac{1}{\left(\sqrt{2\pi}\,\sigma\right)^{N^2}} \exp\left(-\frac{\|y - Ax\|^2}{2\sigma^2}\right)$$

The spectral components $x^j$ that form the full-resolution spectral image x may be correlated, and the degree of correlation may be related to the amount of overlap between spectral bands in the HSI sensor's spectral mosaic. In some implementations, a prior model for the unknown full-resolution spectral image x may be constructed by decomposing the unknown full-resolution spectral image x into its q decorrelated spectral components, and then modeling each of the resulting decorrelated spectral components using a 2-dimensional (2D) Gaussian Markov random field (GMRF) prior model.

For example, let T be an invertible decorrelation transform that linearly maps the correlated vector $x_i$ to a decorrelated space, such that:

$$z_i \triangleq Tx_i \in \mathbb{R}^q$$

where $$T \triangleq [t_0, t_1, \ldots, t_{q-1}]^T \in \mathbb{R}^{q \times q}$$

$$z_i, \triangleq [z_i^0, z_i^1, \ldots, z_i^{q-1}]^T$$

where the values of $t_{[0:q-1]}$ are the q×1 column vectors that form the invertible decorrelation transform T, and $z_i^j \triangleq t_j^T x_i$ is the value of the $j^{th}$ decorrelated spectral channel $z^j \in \mathbb{R}^{N^2}$ of the pixel 305 at vectorial location i. The full decorrelated spectral channel $z^j$ for $j \in \{0, 1, \ldots q-1\}$ may be constructed from $x_i$ using the linear transformation $z^1 \triangleq T^j x$ where:

$$T^j \triangleq I_{N^2} \otimes t_j^T$$

Each of the decorrelated channels $z^j$ may then be modeled using a 2D homogeneous GMRF defined as:

$$p(z^j) = \frac{|B^j|^{1/2}}{(2\pi)^{N^2/2}} \exp\left\{-\frac{1}{2} z^{jT} B^j z^j\right\}$$

where $B^j$ is a symmetric positive definite matrix. In some aspects, the symmetric positive definite matrix $B^j$ may be expressed as:

$$B^j \triangleq \frac{1}{\sigma_j^2} B \in \mathbb{R}^{N^2 \times N^2}$$

The symmetric positive definite matrix $B^j$ may be referred to herein as a precision matrix. Elements in the precision matrix of a GMRF are non-zero only for neighbors and diagonal elements. Thus, $k \notin \{1\mathcal{N}\} \Leftrightarrow b_{k,l}=0$. The variance $\sigma_j^2$ may be referred to as the non-causal prediction variance.

Using GMRF modeling assumptions, the uncorrelatedness of $z^j$ for different values of j may imply that the decorrelated channels are statistically independent of each other. Thus, the full spectral image in the decorrelated space may be expressed as:

$$z \triangleq [z_0, z_1, \ldots, z_{N^2-1}]^T \in \mathbb{R}^{qN^2}$$

The full spectral image may have a probability density function expressed as:

$$p(z) = \prod_{j=0}^{q-1} p(z^j)$$

When rearranged as a function of x, the probability density function may be expressed as:

$$p(x) = \frac{\left|\prod_{j=0}^{q-1} T^j\right| |B|^{q/2}}{(2\pi\sigma_j^2)^{qN^2/2}} \exp\left\{-\sum_{j=0}^{q-1} \frac{1}{2\pi\sigma_j^2} x^T T^{jT} B T^j x\right\}$$

For a homogeneous GMRF prior model, the precision matrix B represents the application of a linear space invariant 2D filter to an image. The precision matrix B may have a block circulant structure including a number of circular blocks (BCCB). In some aspects, if periodic image boundary conditions and vectorial pixel ordering are assumed, the resulting precision matrix B may be expressed as:

$$B = \sum_{k=0}^{N/p-1} I_{N/p}^k \otimes B_k$$

$$= \sum_{k=0}^{N/p-1} I_{N/p}^k \otimes \left\{\sum_{j=0}^{N/p-1} I_{N/p}^j \otimes B_{k,l}\right\}$$

$$= \sum_{j,k=0}^{N/p-1} I_{N^2/p^2}^{Nk/p+j} \otimes B_{k,l}$$

where $B_k \in \mathbb{R}^{Np \times Np}$, $B_{k,l} \in \mathbb{R}^{p^2 \times p^2}$, and $I_N^k$ is an N×N k-upper shift matrix (e.g., an N×N identity matrix with rows shifted to the right by k units). The precision matrix B may be formed by a set of Np×Np blocks-$B_k$-organized in a block circulant structure. Each Np×Np block $B_k$ may also be block circulant, and may be formed by a set of $p^2 \times p^2$ blocks $B_{k,l}$.

After determining the forward image models and the prior image models, the MAP estimate of the full-resolution spectral image x may be expressed as:

$$\hat{x} = \arg\min_{x \in \mathbb{R}^{qN^2}} \{-\log p(y|x) - \log p(x)\} =$$

$$\arg\min_{x \in \mathbb{R}^{qN^2}} \left\{\frac{1}{2\sigma^2} \|y - Ax\|^2 + \sum_{j=0}^{q-1} \frac{1}{2\sigma_j^2} x^T T^{jT} B T^j x\right\}.$$

In some implementations, the parameter $\sigma^2$ may be empirically selected. A relatively small value of $\sigma^2$ (e.g., less than a first amount) may result in the reconstruction problem being ill-posed, while a relatively large value for $\sigma^2$ (e.g., greater than or equal to a second amount) may result in over-smoothing of the reconstructed image.

Approximate solutions for the MAP estimation for the full-resolution spectral image x may be determined using iterative optimization methods such as, for example, gradient descent, conjugate gradient, and the like. However, these iterative optimization methods may not be computationally efficient for software applications, and may not be feasible for implementation in low-cost imaging hardware. Because iterative optimization methods for determining the MAP estimate of the full-resolution spectral image x may be computationally expensive for real-time applications, the MAP reconstruction operator may be pre-computed and sparsified, for example, to allow for the efficient interpolation of raw image data provided by an associated HSI sensor in real-time.

The MAP estimation for the full-resolution spectral image x may be computed in closed-form as follows:

$$\hat{x} = \left(A^T A + \sum_{j=0}^{q-1} \frac{\sigma^2}{\sigma_j^2} T^{jT} B T^j\right)^{-1} A^T y.$$

and thus the reconstruction matrix (H) for a given HSI sensor may be defined as:

$$H \triangleq = \left(A^T A + \sum_{j=0}^{q-1} \frac{\sigma^2}{\sigma_j^2} T^{jT} B T^j\right)^{-1} A^T$$

The full-resolution spectral image x may be reconstructed from the raw image data y by computing the matrix vector product $\hat{x}=Hy$. The reconstruction matrix H is independent of the raw image data y, and therefore may be pre-computed for HSI sensors having a known spectral mosaic.

For a relatively large value of N (e.g., for values of N greater than an amount), the direct matrix vector product $\hat{x}$ may be prohibitively expensive both in terms of memory resources and computational resources. More specifically, because the reconstruction matrix H may be expressed as $H \in \mathbb{R}^{qN^2 \times N^2}$, the size of the reconstruction matrix H is exponentially related to the value of N. Thus, for values of N greater than the amount, the resulting size of the reconstruction matrix H may render its computation and storage infeasible, particularly for low-power (e.g., battery-powered) devices such as smartphones and tablet computers. Moreover, because the direct matrix vector product $\hat{x}$ may have a complexity on the order of $O(qN^4)$, computing and storing the direct matrix vector product $\hat{x}$ may also be infeasible.

Aspects of the present disclosure may select image forward models and image prior models in a manner that allows the reconstruction matrix H to have a block circulant structure with circulant blocks, which in turn may significantly reduce the computational resources to determine the direct matrix vector product $\hat{x}=Hy$ as well as the memory resources to store the determined value of the direct matrix vector product $\hat{x}$ (e.g., as compared to conventional techniques). As noted above, $$H \triangleq = \left(A^T A + \sum_{j=0}^{q-1} \frac{\sigma^2}{\sigma_j^2} T^{jT} B T^j\right)^{-1} A^T.$$

Further, the linear spectral compression operator A may be expressed as $A = I_{N^2/p^2} \otimes A_b$, and $A_b \in \mathbb{R}^{p^2 \times qp^2}$. Consequently, it may be shown that $$A^T A = \left(I_{N^2/p^2} \otimes A_b\right)^T \left(I_{N^2/p^2} \otimes A_b\right)$$
$$= I_{N^2/p^2} \otimes A_b^T A_b.$$

Thus, $A^T A$ is a block diagonal matrix having $qp^2 \times qp^2$ blocks- $A_b^T A_b$-on its diagonal.

It may also be shown that $$\sum_{j=0}^{q-1} T^{jT} B T^j = B \otimes \sum_{j=0}^{q-1} t_j t_j^T$$
$$= \sum_{k,l=0}^{N/p-1} I_{N^2/p^2}^{Nk/p+l} \otimes B_{k,l} \otimes \sum_{j=0}^{q-1} t_j t_j^T$$
$$= \sum_{k,l=0}^{N/p-1} \sum_{j=0}^{q-1} I_{N^2/p^2}^{Nk/p+l} \otimes (B_{k,l} \otimes t_j t_j^T)$$

Because $B_{k,l} \in \mathbb{R}^{p^2 \times p^2}$ and $t_j t_j^T \in \mathbb{R}^{q \times q}$, $(B_{k,l} \otimes t_j t_j^T) \in \mathbb{R}^{qp^2 \times qp^2}$. Accordingly, $$\sum_{j=0}^{q-1} \frac{\sigma^2}{\sigma_j^2} T^{jT} B T^j \in \mathbb{R}^{qN^2 \times qN^2}$$

is a BCCB matrix with $qp^2 \times qp^2$ circulant blocks.

Because the reconstruction matrix H for any BCCB matrix equals the BCCD matrix, it may be shown that $$Q \triangleq = \left(A^T A + \sum_{j=0}^{q-1} \frac{\sigma^2}{\sigma_j^2} T^{jT} B T^j\right)^{-1} \in \mathbb{R}^{qN^2 \times qN^2}$$

and $$H = QA^T \in \mathbb{R}^{qN^2 \times qN^2}$$

are both block circulant matrices with $qp^2 \times qp^2$ and $qp^2 \times p^2$ circulant blocks, respectively. It follows that the reconstruction matrix H may be expressed as:

$$H = \sum_{k,l=0}^{N/p-1} I_{N^2/p^2}^{Nk/p+l} \otimes H_{k,l}$$

where $H_{k,l} \in \mathbb{R}^{qp^2 \times p^2}$. The block circulant structure of the reconstruction matrix H allows the value of H to be uniquely defined by a set of $qp^2 \times p^2$ block elements $H_{k,l}$ where $0 \le k, l \le N/p-1$.

Accordingly, the reconstruction matrix H may be represented in terms of the coefficients of only its first $qp^2$ contiguous rows—which may be denoted by a row submatrix $R^H \in \mathbb{R}^{qp^2 \times N^2}$. In addition, or in the alternative, the reconstruction matrix H may be represented by its first $p^2$ contiguous columns—which may be denoted by a column submatrix $C^H \in \mathbb{R}^{qN^2 \times p^2}$. Thus, estimated values for the column submatrix $C^H$ or the row submatrix $R^H$ may be used to estimate the reconstruction matrix H. In this manner, the block circulant structure of the reconstruction matrix H may be exploited to determine an offline estimation of the reconstruction matrix H using significantly less computational and memory resources than conventional techniques. In some aspects, the estimated reconstruction matrix H may have a complexity of at most $O(qp^2N^2)$—which is one or more orders of magnitude less than the complexity $O(qN^4)$ of the reconstruction matrix H. Further, as discussed below, the sparsity of the columns of the reconstruction matrix H may be reduced, which in turn may reduce the complexity of estimating the reconstruction matrix H.

Figure 4:
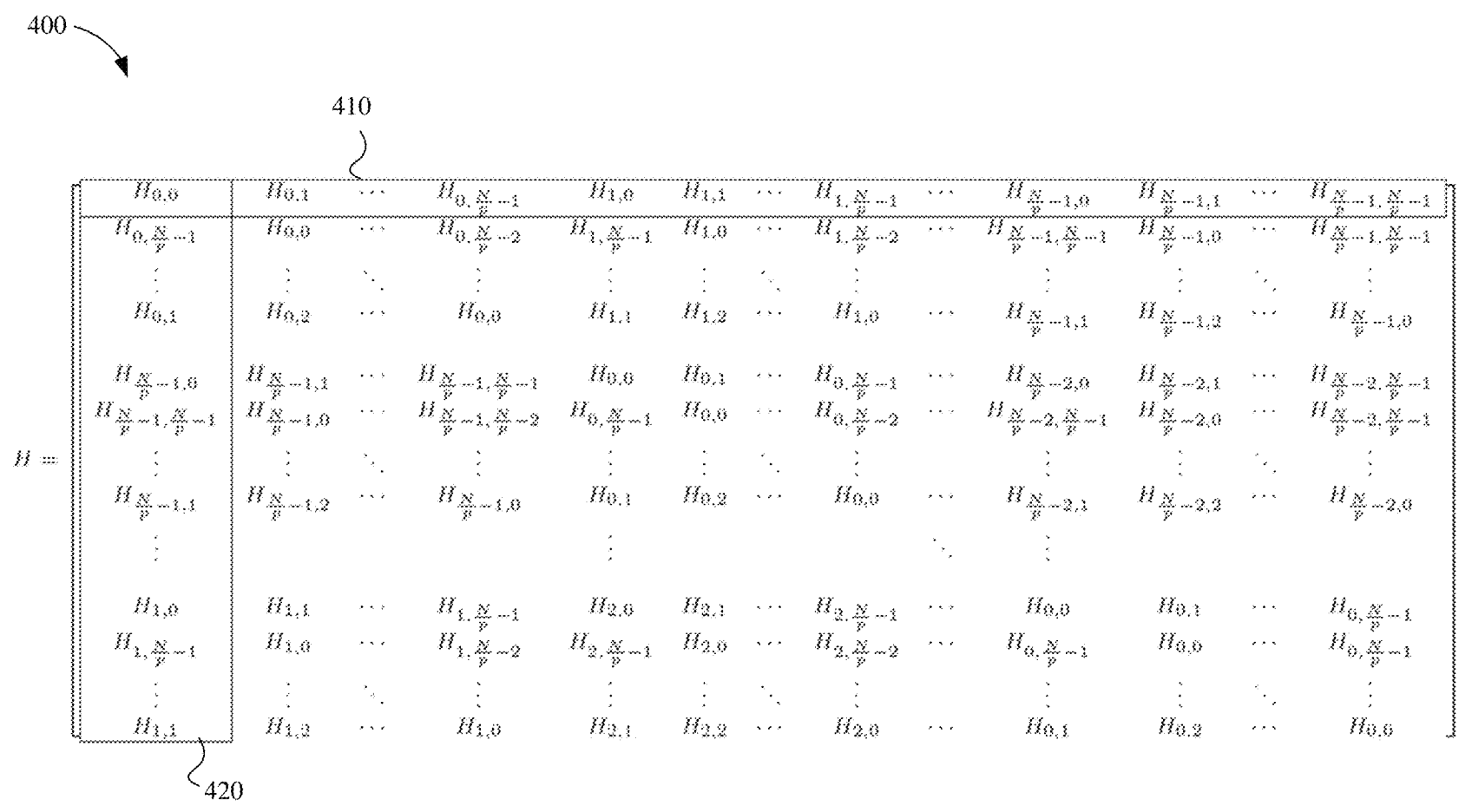

FIG. 4 shows an example reconstruction matrix H having a block circulant structure 400. The reconstruction matrix H is shown to include a row submatrix $R^H$ 410 and a column submatrix $C^H$ 420. The block circulant structure 400 of the reconstruction matrix H allows the entire reconstruction matrix H to be represented or reconstructed based on the values of the row submatrix $R^H$ 410 or the column submatrix $C^H$ 420 (or both). As discussed above, $$\chi_0 = [x_0^T, \ldots, x_{qp^2-1}^T]^T$$

represents the vector intensity values for the p×p pixel block in the top-left corner of the reconstructed image x, where each $x_i=[x_i^0, \ldots, x_i^{q-1}]^T$. The first $qp^2$ contiguous rows of the reconstruction matrix H, which represent the unknown intensity values for the top-left corner p×p pixel block of the reconstructed image, may be estimated based on the raw image data y using the equation: $\mathcal{X}_0 = R^H y$. Thus, the rows of the submatrix $R^H$ 410 may be considered as 2D interpolation filters for estimating the unknown spectral values based on the observed raw image data y. A total of $qp^2$ of the 2D interpolation filters may be used to estimate the $qp^2$ unknown spectral values $x_i^j$ (which constitute the intensity vector $\mathcal{X}_0$ for the top-left corner p×p pixel block of the reconstructed image x. Because of the block circulant structure of the reconstruction matrix H, the same set of $qp^2$ interpolation filters (e.g., the rows of the submatrix $R^H$) may be used to estimate all of the other unknown blocks $\mathcal{X}_i$ of the reconstructed image x.

More specifically, the row of the submatrix $R^H$—which may be denoted $r_l$—represents an interpolation filter $h_{m,n}^{x^j,\phi}$ that estimates the $j^{th}$ spectral value of the pixel 305 at vectorial location $i \in \{0, 1, \ldots, N^2-1\}$, $x_j^i$, with a phase value $\phi$. Thus, $r_l \to h_{m,n}^{x^j,\phi}$ $j = l \bmod q \in \{0,1, \ldots, q-1\}$ $\phi = \lfloor l/q \rfloor = i \bmod p^2 \in \{0,1, \ldots, p^2-1\}$ $l \in \{0,1, \ldots, qp^2-1\}$ Because an interpolation filter $h_{m,n}^{x^j,\phi}$ may use intensity values from a number of the q bands or channels for estimating a given spectral channel j, the interpolation filter $h_{m,n}^{x^j,\phi}$ may be referred to here as a "cross-band interpolation filter."

Determining cross-band interpolation filters in the manner described above allows for smaller filter sizes (as compared with directly computing the direct matrix vector product $\hat{x}=Hy$). For example, referring again to FIG. 1, a total of $qp^2=3\times2^2=12$ unique 2D interpolation filters may be used for the spectral mosaic 110A corresponding to the 16-pixel Bayer sensor, a total of $qp^2=4\times4^2=64$ unique 2D interpolation filters may be used for the spectral mosaic 120A corresponding to the 16-pixel NIR filter, and a total of $qp^2=8\times4^2=128$ unique 2D interpolation filters may be used for the spectral mosaic 130A corresponding to the HSI sensor.

The cross-band interpolation filters derived from MAP estimations have a highly compact support, for example, such that the filter coefficients rapidly decay as a function of distance from the center pixel of the pixel grid. The cross-band interpolation filter coefficients may rapidly decay because the spectral estimation at a given pixel is a function of the spectral values in a spatial vicinity within which the interpolation is performed. In some implementations, the cross-band interpolation filters may be selected as $h_{m,n}^{x^j,99}$ filters having an M×N support, with M<<N. In some aspects, setting the value of M=11 may maximize the efficiency with which the cross-band interpolation filters may estimate the full-resolution image data x. For example, selecting M<<N may allow for an accurate estimation of the full-resolution image data x with reduced complexity (as compared to complexity levels on the order of $O(qp^2N^2)$. More specifically, estimating the full-resolution image data x using cross-band interpolation filters having an M×N support may have a complexity on the order of $O(qM^2p^2)$. In this manner, the computational and memory resources associated with recovering full-resolution image data x from the raw image data y may be reduced by selecting the value of M to be much lower than the value of N.

The computation of the MAP estimate $\hat{x}=Hy$ may be determined by cyclically convolving the raw image data y with a bank of $qp^2$ M×N cross-band interpolation filters $\{h_{m,n}^{x^j,99}\}$, and selecting the filter outputs with the correct phase $\phi \in \{0,1, \ldots, p^2-1\}$, to form a spectral vector x for each pixel location i.

In some implementations, the reconstruction matrix H may be estimated once for each given HSI sensor. Once estimated or otherwise obtained for a given HSI sensor, the reconstruction matrix H may be used to interpolate all raw image data captured or provided by the given HSI sensor.

The block circulant structure of the reconstruction matrix H also allows the reconstruction matrix H to be uniquely determined by estimating its first $p^2$ columns. More specifically, the first $p^2$ columns of the reconstruction matrix H may be estimated to determine the $qN^2 \times p^2$ column submatrix $C^H$, and then the entire reconstruction matrix H may be derived or estimated based on the column submatrix $C^H$. Because the columns of the reconstruction matrix H represent responses of the linear system x=Hy to spatially shifted unit impulses, the column submatrix $C^H \triangleq [c_0, c_1, \ldots, c_{p^2-1}]$ may be determined column-by-column with the $i^{th}$ column computed by $$\hat{c}_i = \arg\min_{x \in \mathbb{R}^{qN^2}} \left\{ \frac{1}{2\sigma^2} \|e_i - Ax\|^2 + \sum_{j=0}^{q-1} \frac{1}{2\sigma_j^2} x^T T^{jT} B T^j x \right\}$$

where $e_i$ is the $i^{th}$ unit vector. An appropriate algorithm may be used to optimize the determination of the column submatrix $C^H$. In some implementations, a conjugate gradient algorithm may be used to optimize the calculation of the column submatrix $C^H$. Once determined, the column submatrix $C^H$ may be used to determine or estimate the entire reconstruction matrix H. For example, each of the $qp^2$ rows of $R^H$ may be arranged as an N×N 2D filter to estimate a missing spectral component at a specific phase in the spectral mosaic of the HSI image data. In some aspects, filter coefficients outside of an M×M window centered at a current pixel may be discarded with an acceptable impact on image quality. The retained filter coefficients may be normalized such that the retained filter coefficients sum to unity. The resultant cross-band interpolation filter set $\{h_{m,n}^{x^j,99}\}$ may be used to process the raw image data y captured or provided by the associated HSI sensor.

The implementations described above assume that a pixel's local density is independent of its absolute position within an image, and may therefore employ isotropic interpolation. Although significantly reducing the number of non-causal prediction parameters, this assumption may also lead to smoothing and aliasing artifacts in the interpolated image. In some aspects, bi-directional interpolation techniques may be used to reduce undesirable smoothing and aliasing artifacts (e.g., rather than the isotropic interpolation operators discussed above).

In other implementations, one or more directional interpolation estimates may be determined. For example, a directional interpolated estimate $\hat{x}^\gamma$ may be determined using a homogeneous GMRF prior model which enforces smoothness only along a direction specified by the parameter γ. In some aspects, a directionally interpolated estimate may be determined based on a precision matrix $B^\gamma$ such that:

$$\hat{x}^\gamma = \left(A^T A + \sum_{j=0}^{q-1} \frac{\sigma^2}{\sigma_j^2} T^{jT} B^\gamma T^j\right)^{-1} A^T y = H^\gamma y$$

The parameter $\gamma$ may take one or two values, and may represent two orthogonal directions in the 2D plane. In other words, $\gamma \in \{\eta, \mu\}$. In some aspects, the terms $\eta$ and $\mu$ may represent the horizontal and vertical directions, respectively, in the 2D plane corresponding to the image. In other aspects, the parameter $\gamma$ may represent other orthogonal pairs of directions in the 2D plane corresponding to the image.

A precision matrix $B^\gamma$ may be a block circulant structure matrix representing the application of a 2D linear space-invariant filter $g_{m,n}^\gamma$ to an image, for example, in a manner similar to that described above with respect to the isotropic examples. For example, the 2D linear space-invariant filters $g_{m,n}^\eta$ and $g_{m,n}^\mu$ may correspond to enforced smoothness along a horizontal direction and a vertical direction, respectively, in the 2D plane corresponding to the image. In one example, $$g_{m,n}^\eta = \begin{bmatrix} 0 & 0 & 0 & 0 & 0 \\ 0 & 0 & 0 & 0 & 0 \\ 1/6 & -2/3 & 1 & -2/3 & 1/6 \\ 0 & 0 & 0 & 0 & 0 \\ 0 & 0 & 0 & 0 & 0 \end{bmatrix}$$

and $$g_{m,n}^\mu = \begin{bmatrix} 0 & 0 & 1/6 & 0 & 0 \\ 0 & 0 & -2/3 & 0 & 0 \\ 0 & 0 & 1 & 0 & 0 \\ 0 & 0 & -2/3 & 0 & 0 \\ 0 & 0 & 1/6 & 0 & 0 \end{bmatrix}$$

A horizontal interpolation operator $H^\eta$ may provide better interpolation results in areas or portions of an image dominated by horizontal edges, while a vertical interpolation operator $H^\mu$ may provide better results in areas or portions of the image dominated by vertical edges. The horizontal interpolation operator $H^\eta$ and the vertical interpolation operator $H^\mu$ may be combined so that a convex average of a horizontally interpolated estimate and a vertically interpolated estimate may be used at each pixel location $i$ to determine a combined interpolated image, such that:

$$\hat{x}_i = \beta_i \hat{x}_i^\eta + (1-\beta_i)\hat{x}_i^\mu$$

where $\beta_i$ is a value between 0 and 1 representing a degree of predominance of edges in the $\eta$ or $\mu$ directions. For implementations in which the two directions are a horizontal direction and a vertical direction, $\beta_i = 1$ may represent a portion of an image dominated by horizontal edges, and $\beta_i = 0$ may represent a portion of the image dominated by vertical edges. In some aspects, an edge classifier may be used to determine $\beta_i$, as discussed in more detail below.

The estimated reconstruction matrices $H^\gamma$ are $qN^2 \times N^2$ block circulant matrices having $qp^2 \times p^2$ circulant blocks. As a result, the directional reconstruction matrices may be uniquely represented by a set of $qp^2$ contiguous rows or by a set of $p^2$ contiguous columns of the estimated reconstruction matrices. Thus, a row submatrix $R^{H^\gamma} \in \mathbb{R}^{qp^2 \times N^2}$ may represent the first $qp^2$ rows of the reconstruction matrices $H^\gamma$, and a column submatrix $C^{H^\gamma} \in \mathbb{R}^{N^2 \times p^2}$ may represent the first $p^2$ columns of the reconstruction matrices $HY$. For each interpolation direction $\gamma$, the column submatrix $C^{H^\gamma} \triangleq [c_0^\gamma, \ldots, c_{p^2-1}^\gamma]$ may be determined column-by-column, for example, such that:

$$\hat{c}_i^\gamma = \arg\min_{x \in \mathbb{R}^{qN^2}} \left\{ \frac{1}{2\sigma^2} \|e_i - Ax\|^2 + \sum_{j=0}^{q-1} \frac{1}{2\sigma_j^2} x^T T^{jT} B^\gamma T^j x \right\}$$

In some aspects, the row submatrix $R^{H^\gamma}$ may be determined by estimating the column submatrix $C^{H^\gamma}$, where each of the $qp^2$ rows of the row submatrix $R^{H^\gamma}$ corresponds to a 2D interpolation filter. More specifically, the row of the row submatrix $R^{H^\gamma}$—which may be denoted $r_l^\gamma$—represents an interpolation filter $h_{m,n}^{\gamma,x^j,99}$ that estimates the $j^{th}$ spectral value at pixel $i \in \{0, 1, \ldots, N^2-1\}$, $x_j^i$, with a phase value $\phi$. Thus, $$r_l^\gamma \rightarrow h_{m,n}^{\gamma,x^j,99}$$

$$j = l \bmod q \in \{0, 1, \ldots q-1\}$$

$$\phi = \lfloor l/q \rfloor = i \bmod p^2 \in \{0, 1, \ldots, p^2-1\}$$

and $$l \in \{0, 1, \ldots, qp^2-1\}$$

In some implementations, the cross-band directional interpolation filters derived from the MAP estimations have a highly compact support, for example, such that their filter coefficients rapidly decay as a function of distance from the center pixel of the spectral mosaic. Thus, in some aspects, the cross-band directional interpolation filters may be selected to have an M×M support without significant loss of quality, with M<<N. In some aspects, the value of M may be selected to be 11.

In implementations which employ directional interpolation filters, an edge classifier may be used to determine the value of $\beta_i$ (which may be referred to herein as an edge predominance factor). In some implementations, the value of $\beta_i$ may be based at least in part on an estimated edge energy in the $\eta$ and $\mu$ directions. For example, in some aspects, the following sets of filters may be used to estimate edge energies:

$$f_{m,n}^{\eta,x^j,\phi} = \frac{h_{m,n}^{\eta,x^j,\phi} + h_{m,n}^{\mu,x^j,\phi}}{2} - \frac{h_{m,n+1}^{\eta,x^j,\phi_1} + h_{m,n+1}^{\mu,x^j,\phi_1}}{2}$$

$$f_{m,n}^{\mu,x^j,\phi} = \frac{h_{m,n}^{\eta,x^j,\phi} + h_{m,n}^{\mu,x^j,\phi}}{2} - \frac{h_{m+p,n}^{\eta,x^j,\phi_p} + h_{m+p,n}^{\mu,x^j,\phi_p}}{2}$$

where $\phi_1 \triangleq (\phi+1) \bmod p$, and $\phi_p \triangleq (\phi+p) \bmod p^2$, for $\phi \in \{0, 1, \ldots, p^2-1\}$, and $j \in \{0, 1, \ldots, q-1\}$. The raw image data may be convolved with the high-pass edge detection filters $f_{m,n}^{\eta,x^j,99}$ and $f_{m,n}^{\mu,x^j,99}$ to determine respective edge maps $e_{m,n}^{\eta,x^j,99}$ and $e_{m,n}^{\mu,x^j,99}$. The edge predominance factor at a pixel location (m,n) may then be determined as:

$$\beta_{m,n} = \frac{\sum_{j=0}^{q-1} |e_{m,n}^{\eta,x^j,\phi}|}{\sum_{j=0}^{q-1} (|e_{m,n}^{\eta,x^j,\phi}| + |e_{m,n}^{\mu,x^j,\phi}|) + \epsilon}$$

where φ is a regularization constant selected to regularize $\beta_{m,n}$. In some aspects, the value of φ may be selected as 0.001. In other aspects, the value of φ may be any other suitable value.

As discussed above, because the reconstruction matrices constructed for an HSI sensor do not depend on the raw image data received from the HSI sensor, the reconstruction matrices may be precomputed. As a result, a training operation may be used to determine each of the reconstruction matrices and their associated cross-band interpolation filters for an HSI sensor (such as the HSI sensor 210 of FIG. 2). In addition, because the reconstruction matrices remain constant for processing all raw image data captured or provided by a given HSI sensor, the training operations disclosed herein may be performed prior to processing operations that recover full-resolution spectral data from raw image data provided by the given HSI sensor. In some aspects, the training operation may be an "offline" training operation.

In some implementations, the training operation may initially configure a device (e.g., the cross-band interpolation circuit 260 of FIG. 2) to process raw image data captured or provided by a first HSI sensor having a first spectral mosaic, and may subsequently re-configure the device (e.g., the cross-band interpolation circuit 260 of FIG. 2) to process raw image data captured or provided by a second HSI sensor having a second spectral mosaic that is different than the first spectral mosaic.

A number of parameters may be used to perform the training operation and/or to estimate the columns of each of the reconstruction matrices $H^\gamma$. In some implementations, the parameters may include any number of the following: the spectral sampling matrix A; the variance parameter $\sigma^2$; the GMRF precision matrices $B^\gamma$; the GMRF non-causal prediction variances $\sigma_j^2$; and the spectral decorrelation matrices $T^j$.

The spectral sampling matrix A may be determined based on the spatial arrangement of the spectral filters in one unit block of a given HSI sensor's spectral mosaic. As discussed above, the spectral sampling matrix A may be a block diagonal matrix having $p^2 \times qp^2$ blocks, formed as an outer product of the matrix $A_b$ and a large identity matrix.

The value of the variance parameter $\sigma^2$ may be empirically selected. In some implementations, the variance parameter $\sigma^2$ may have a relatively large value (e.g., greater than a certain value) to increase the smoothness of reconstructed images. In some aspects, the selected value of the variance parameter $\sigma^2$ may be 0.3. In other aspects, the variance parameter $\sigma^2$ may be of other suitable values.

As discussed above, the precision matrices $B^\gamma$ are block circulant structure matrices that each represent an application of a 2D spatially invariant filter $g_{m,n}^\gamma$ to an image. In some implementations, the 2D spatially invariant filters $b_{m,n}^\gamma$ may be selected for $\gamma \in \{\eta, \mu\}$, where η and μ correspond to orthogonal directions in the 2D plane (e.g., a horizontal direction and a vertical direction, respectively, of the image). In some aspects, the term $g_{m,n}^\gamma$ may be manually selected, and may correspond to the example $g_{m,n}^\eta$ and $g_{m,n}^\mu$ matrices described above.

The decorrelation matrices $T^j$ and the non-causal prediction variances $\sigma_j^2$ may be determined based on the spectral responses of the color filters of the given HSI sensor's spectral mosaic. More specifically, let $S \triangleq [s_0, \ldots, s_{q-1}]$ be a matrix having columns representing the spectral response curves for each of the q spectral bands of the given HSI sensor. The q×q covariance matrix of the spectral responses may be defined as $C \triangleq S^T S$. Then, a q×q transform T that decorrelates the response curves $s_j$ may be computed using a principal component analysis of the covariance matrix C, for example, such that $C \triangleq T\Sigma T^T$, where $T=\{t_0, \ldots, t_{g-1}\}$ and $\Sigma = \text{diag}([\sigma_0^2, \ldots, \sigma_{q-1}^2])$ are the respective matrices of eigenvectors and eigenvalues. The GMRF parameters $\sigma_j^2$ may be selected as the eigenvalues of the covariance matrix C. The eigenvectors $t_j$ may then be used to compute or determine the decorrelation transforms $T^j$ using the previously-discussed equation $T^j \triangleq I_{N^2} \otimes t_j^T$.

After determining the parameters to be used for the training operation, the reconstruction matrices $H^\gamma$ may be estimated. The reconstruction matrices may be estimated in a column-by-column manner using any suitable technique (such as a conjugate gradient algorithm) to solve the equation below:

$$\hat{c}_i^\gamma = \arg\min_{x \in \mathbb{R}^{qN^2}} \left\{ \frac{1}{2\sigma^2} \|e_i - Ax\|^2 + \sum_{j=0}^{q-1} \frac{1}{2\sigma_j^2} x^T T^{jT} B^\gamma T^j x \right\}$$

As noted above, the first $qp^2$ unique rows of the reconstruction matrix H correspond to the sets of directional cross-band interpolation filters $h_{m,n}^{\gamma,x^j,99}$ for each direction y. In some aspects, the filter coefficients outside of an M×M window around the central pixel of the image may be discarded (e.g., where M<<N), for example, because the filter coefficients are compact. In some aspects, the value of M may be 11. In other aspects, the value of M may be any other suitable value. In some implementations, the retained filter coefficients may be normalized, for example, so that the retained filter coefficients of each of the cross-band interpolation filters $h_{m,n}^{\gamma,x^j,99}$ sum to unity.

Once the filter coefficients are determined, the directional cross-band interpolation filters $h_{m,n}^{\gamma x^j,99}$ may be configured with the determined filter coefficients. The resulting directional cross-band interpolation filters $h_{m,n}^{\gamma x^j,99}$ may be used to determine one or more edge classification filters $f_{m,n}^{\gamma x^j,99}$ for classifying edges in raw image data captured or provided by the given HSI sensor. After the training operation is completed, the directional cross-band interpolation filters and the edge classification filters may be used to process raw image data captured or provided by the given HSI sensor. In some implementations, the cross-band interpolation circuit 260 may be configured using configuration data (e.g., the filter coefficients, the edge classification factors, and so on) determined during the training operation, and thereafter may be used to recover full-resolution spectral data based on HSI mosaic data captured or provided by the HSI sensor. In some aspects, the filter coefficients, the edge classification factors, and other parameters associated with the configuration data may be stored in the memory 230 (e.g., within the data store 231).

Figure 5:
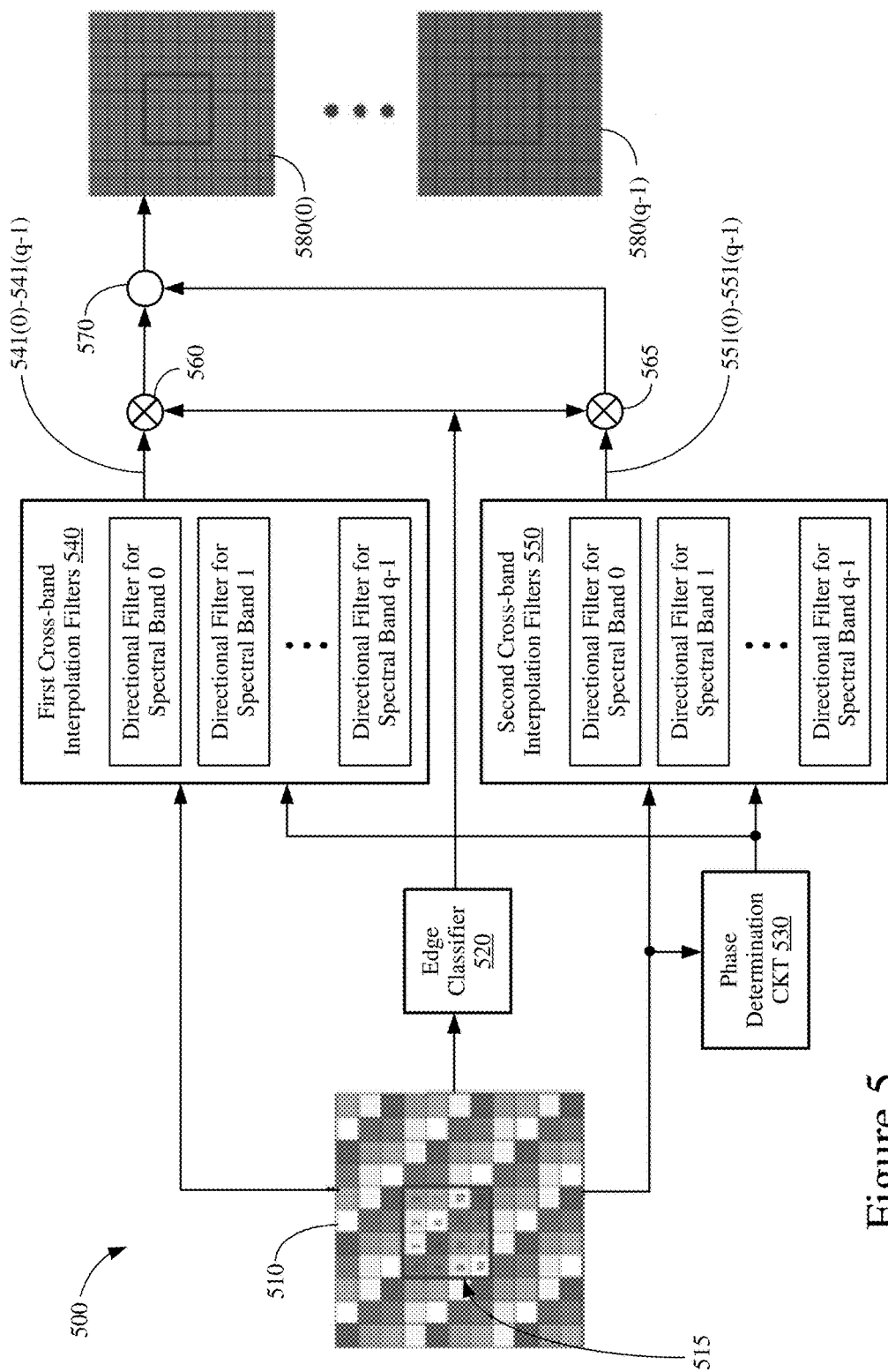
FIG. 5 shows an example cross-band interpolation circuit that may be used to process HSI data.

FIG. 5 shows an example cross-band interpolation circuit 500 that may be used to process HSI data. The cross-band interpolation circuit 500, which may be one implementation of the cross-band interpolation circuit 260 of FIG. 2, may receive image data represented as HSI mosaic data 510. The HSI mosaic data 510 may include an integer number of unit blocks 515. The unit blocks 515 may be one implementation of the p×p pixel blocks 310 described above with respect to FIG. 3. In some aspects, the unit blocks 515 of the HSI mosaic data 510 may be identical to one another. In some implementations, the HSI mosaic data 510 may be captured or provided by an associated HSI sensor (not shown for simplicity). In other implementations, the HSI mosaic data 510 may be provided by another circuit, device, or system (not shown for simplicity).

The cross-band interpolation circuit 500 is shown to include an edge classifier 520, a phase determination circuit 530, a number of first directional cross-band interpolation filters 540, a number of second directional cross-band interpolation filters 550, a first scaler 560, a second scaler 565, and a summing circuit 570. The edge classifier 520, the phase determination circuit 530, the first directional cross-band interpolation filters 540, and the second directional cross-band interpolation filters 550 may each include an input to receive all or a portion of the HSI mosaic data 510. The edge classifier 520 may include an output coupled to first inputs of the scalers 560 and 565. The phase determination circuit 530 may include an output coupled to inputs of the first directional cross-band interpolation filters 540 and to inputs of the second directional cross-band interpolation filters 550.

The first directional cross-band interpolation filters 540 may include outputs coupled to a second input of the first scaler 560, and the second directional cross-band interpolation filters 550 may include outputs coupled to a second input of the second scaler 565. As depicted in FIG. 5, the first directional cross-band interpolation filters 540 may include a number of first directional filters each corresponding to one of the number q of spectral bands of the HSI sensor. Similarly, the second directional cross-band interpolation filters 540 may include a number of second directional filters each corresponding to one of the number q of spectral bands of the HSI sensor. The summing circuit 570 may include inputs coupled to the outputs of the first scaler 560 and the second scaler 565, and may include an output to provide a number of interpolated images 580(0)-580(q−1) corresponding to the number q of spectral bands of the associated HSI sensor.

The edge classifier 520 may receive each unit block 515 of the HSI mosaic data 510, and may determine an edge classification factor $\beta_{m,n}$ for each pixel (m,n) in a given unit block 515. In some implementations, the edge classification factors may be based at least in part on an estimated edge energy in each of first and second orthogonal directions ($\eta$ and $\mu$) of the image (e.g., as represented by the HSI mosaic data 510). In addition, or in the alternative, the edge classification factors may also be based on one or more reconstruction matrices determined during a previous training operation for the associated HSI sensor. In some aspects, the terms $\eta$ and $\mu$ may correspond to a horizontal direction and a vertical direction, respectively, of the image. In other aspects, the terms $\eta$ and $\mu$ may correspond to any suitable pair of orthogonal directions of the image.

The phase determination circuit 530 may also receive each unit block 515 of the HSI mosaic data 510. The phase determination circuit 530 may, for a respective unit block 515, determine the phase $\phi$ of each pixel in the respective unit block 515. In some aspects, the phase determination circuit 530 may determine the phase of a given pixel in the manner described above with respect to FIG. 3. In other aspects, the phase determination circuit 530 may determine the phase of a given pixel using another suitable technique. After determining the phases of the pixels in each of the unit blocks 515, the phase determination circuit 530 may provide the pixel phase information to the first directional cross-band interpolation filters 540 and to the second directional cross-band interpolation filters 550.

Each of the first directional cross-band interpolation filters 540 and each of the second directional interpolation cross-band filters 550 receives the pixel phase information provided by the phase determination circuit 530 and receives each unit block 515 of the HSI mosaic data 510. In some implementations, the filter coefficients of the first directional cross-band interpolation filters 540 (hereinafter denoted as the first filter coefficients) may be determined or derived based on one or more reconstruction matrices corresponding to the associated HSI sensor, and the filter coefficients of the second directional cross-band interpolation filters 550 (hereinafter denoted as the second filter coefficients) may be determined or derived based on the one or more reconstruction matrices corresponding to the associated HSI sensor, for example, as described above with respect to FIG. 4. In some aspects, the first filter coefficients and the second filter coefficients may be determined during the training operation described above.

The first directional cross-band interpolation filters 540 may be associated with a first direction (e.g., denoted by $\eta$) of the image, and the second directional cross-band interpolation filters 550 may be associated with a second direction (e.g., denoted by $\mu$) of the image that is orthogonal to the first direction. In some aspects, the first directional cross-band interpolation filters 540 are associated with a horizontal direction of the image, and the second directional cross-band interpolation filters 550 are associated with a vertical direction of the image.

Each of the first directional cross-band interpolation filters 540 is configured, by the determined first filter coefficients, to process a respective unit block 515 using the pixel phase information to generate a corresponding one of a number of first directionally interpolated images 541(0)-541(q−1). The first directionally interpolated images 541(0)-541(q−1) may correspond to a first direction of the image, and may be based at least in part on estimated edge energies along the first direction of the image. Further, each of the first directionally interpolated images 541(0)-541(q−1) may correspond to a different spectral band of the HSI sensor, for example, so that each of the first directionally interpolated images 541(0)-541(q−1) includes image data of a different frequency range.

Similarly, each of the second directional cross-band interpolation filters 550 is configured, by the determined second filter coefficients, to process the respective unit block 515 using the pixel phase information to generate a corresponding one of a number of second directionally interpolated images 551(0)-551(q−1). The second directionally interpolated images 551(0)-551(q−1) may correspond to a second direction of the image, and may be based at least in part on estimated edge energies along the second direction of the image. Further, each of the second directionally interpolated images 551(0)-551(q−1) may correspond to a different spectral band of the HSI sensor, for example, so that each of the second directionally interpolated images 551(0)-551(q−1) includes image data of a different frequency range.

The first directionally interpolated images 541(0)-541(q−1) may be scaled by the first scaler 560 based on one or more first edge classification factors determined by the edge classifier 520. Similarly, the second directionally interpolated images 551(0)-551(q-1) may be scaled by the second scaler 565 based on one or more second edge classification factors determined by the edge classifier 520. In some implementations, the first scaler 560 may scale each pixel of a respective first directionally interpolated image 541 by a first scaling factor $\beta_{m,n}$, and the second scaler 565 may scale each pixel of a respective second directionally interpolated image 551 by a second scaling factor $(1-\beta_{m,n})$.

The summing node 570 may sum the first scaled directionally interpolated images 541(0)-541(q-1) and the second scaled directionally interpolated images 551(0)-551(q-1) to determine or generate a set of interpolated images 580(0)-580(q-1). Each of the interpolated images 580(0)-580(q-1) may correspond to different spectral band of the associated HSI sensor. In this manner, the cross-band interpolation circuit 500 may optimize the spatial resolution of the HSI sensor while preserving the spatial structure of the captured image.

Once configured by the training operation described above, the cross-band interpolation circuit 500 may recover full-resolution spectral data from raw image data having any number of spectral bands using any number of arrangements of spectral filters. The raw image data may be provided to the cross-band interpolation circuit 500 as either periodic HSI mosaic data or non-periodic HSI mosaic data. In some implementations, the first directional cross-band interpolation filters 540 and the second directional cross-band interpolation filters 550 may process the unit blocks 515 of the HSI mosaic data 510 in parallel. In some aspects, the configuration data used to configure the edge classifier 520, the first directional cross-band interpolation filters 540, and the second directional cross-band interpolation filters 550 may be stored in the memory 230 (e.g., within the data store 231) of FIG. 2.

Figure 6:
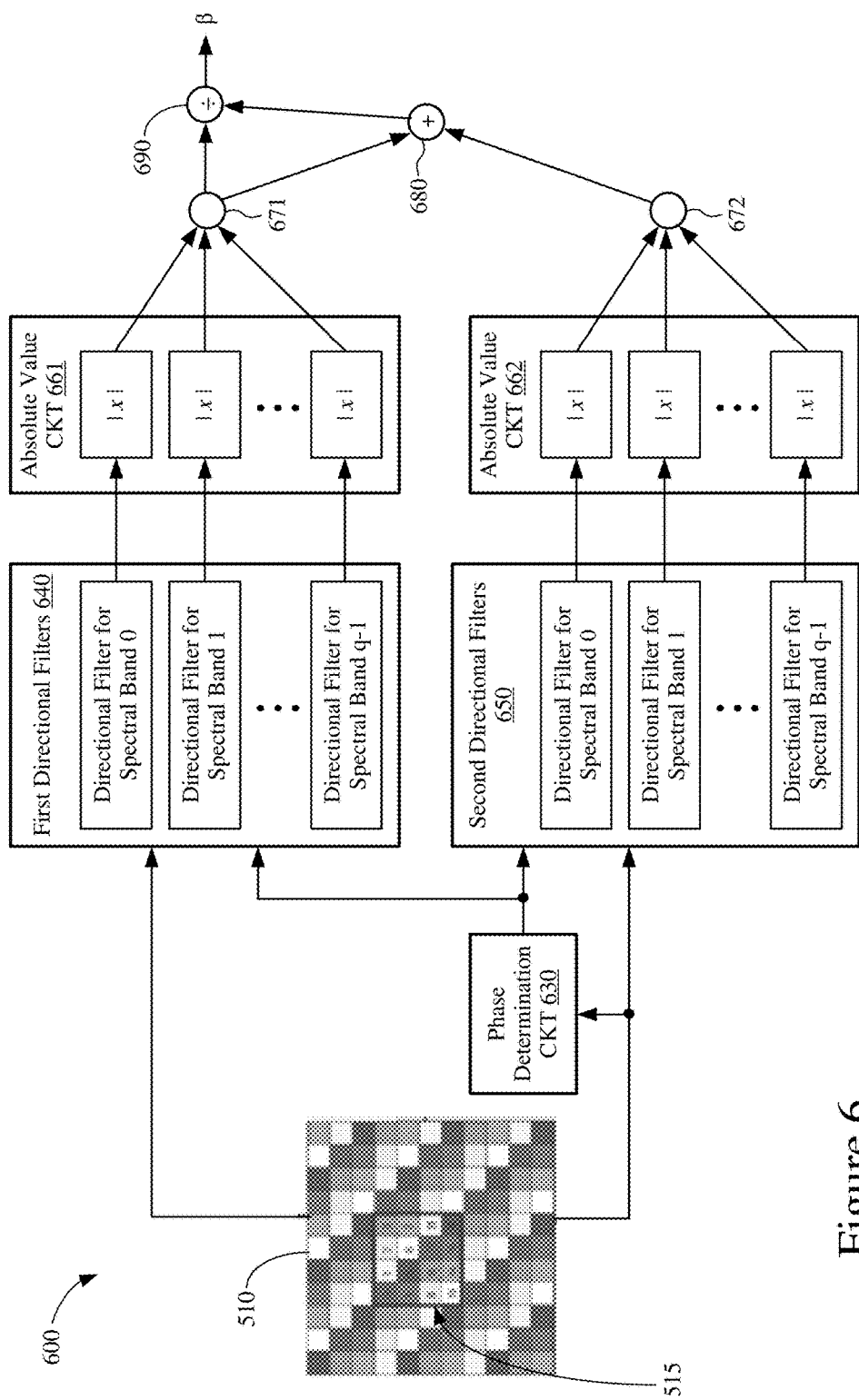
FIG. 6 shows an example edge classifier.

FIG. 6 shows an example edge classifier 600. The edge classifier 600, which may be one implementation of the edge classifier 520 of FIG. 5, may be used to determine an edge classification factor $\beta_{m,n}$ for a given pixel. The edge classifier 600 is shown to include a phase determination circuit 630, a number of first directional filters 640, a number of second directional filters 650, a first absolute value determination circuit 661, a second absolute value determination circuit 662, a first filter summing node 671, a second filter summing node 672, a summing node 680, and a divider 690. The phase determination circuit 630, the first directional filters 640, and the second directional filters 650 may each include an input to receive all or a portion of the HSI mosaic data 510. The phase determination circuit 630 may include an output coupled to inputs of the first directional filters 640 and to inputs of the second directional filters 650.

The first directional filters 640 may include outputs coupled to inputs of the first absolute value determination circuit 661, and the second directional filters 650 may include outputs coupled to inputs of the second absolute value determination circuit 662. The first absolute value determination circuit 661 may include outputs coupled to the first summing node 671, and the second absolute value determination circuit 662 may include outputs coupled to the second summing node 672. The summing node 680 may include inputs coupled to respective outputs of the first and second summing nodes 671-672, and may include an output coupled to the divider 690. The divider 690 may include an output to provide the edge classification factor.

The edge classifier 600 may receive the HSI mosaic data 510 discussed above with respect to FIG. 5. Specifically, the phase determination circuit 630 may receive each unit block 515 of the HSI mosaic data 510, and may determine a phase $\phi$ for each pixel in a respective unit block 615 (e.g., in a manner similar to that described above with respect to FIG. 5). The phase determination circuit 630 may provide the pixel phase information to the first directional filters 640 and to the second directional filters 650. Each of the first directional filters 640 may process the unit block 515 using a respective first directional filter $f_{m,n}^{\eta,x^j,99}$, and each of the second directional filters may process the unit block 515 using a respective second directional filter $f_{m,n}^{\mu,x^j,99}$.

The first absolute value determination circuit 661 may determine the absolute values of the directionally filtered unit blocks provided by the first directional filters 640, and the second absolute value determination circuit 662 may determine the absolute values of the directionally filtered unit blocks provided by the second directional filters 650. The absolute values of the first directionally filtered unit blocks may be summed by the first filter summing node 671, and the absolute values of the second directionally filtered unit blocks may be summed by the second filter summing node 672.

The summed first directionally filtered unit blocks may be provided to a numerator node of the divider 690 and to a first input of the summing node 680, and the summed second directionally filtered unit blocks may be provided to a denominator node of the divider 690 and to a second input of the summing node 680. The output of the divider 690 may provide the edge classification factor $\beta_{m,n}$. As described above, $$\beta_{m,n} = \frac{\sum_{j=0}^{q-1} |e_{m,n}^{\eta,x^j,\phi}|}{\sum_{j=0}^{q-1} (|e_{m,n}^{\eta,x^j,\phi}| + |e_{m,n}^{\mu,x^j,\phi}|) + \epsilon}.$$

FIG. 7 shows an illustrative flow chart depicting an example operation 700 for processing SI data. For purposes of discussion herein, the SI data may be captured or provided by the HSI sensor 210 of FIG. 2, and the example operation 700 may be performed by the cross-band interpolation circuit 260 of FIG. 2. In other implementations, the SI data may be captured or provided by another suitable SI sensor, such as a multispectral imaging sensor, or an ultra-spectral imaging sensor, and the example operation 700 may be performed by the processor 220 of FIG. 2 (e.g., by executing a number of the instruction sets 232-237 stored in the memory 230).

In some implementations, a training operation may be used to configure the cross-band interpolation circuit 260 for an SI sensor. In some aspects, the training operation may be performed by the training logic 270 of FIG. 2. In other aspects, the training operation may be performed by the processor 220. The training operation may determine a spectral mosaic of the SI sensor (702). For example, referring also to FIG. 1, the spectral mosaic 130A corresponding to the 16-pixel HSI sensor is a 4×4 pixel grid including a single 4×4 pixel block, and has a value of N=4, has a value of p=4, has a value q=8, and has a periodicity equal to one.

The training operation may estimate a number of reconstruction matrices based on the spectral mosaic of the SI sensor (704). In some implementations, the reconstruction matrices may be block circulant structures having circulant blocks, which allows each of the reconstruction matrices to be estimated using only a subset of its coefficients. In some aspects, each reconstruction matrix may be represented in terms of the coefficients of only its first $qp^2$ contiguous rows, and estimated values of the resulting row submatrix may be used to estimate the reconstruction matrix. In other aspects, each reconstruction matrix may be represented in terms of the coefficients of only its first $qp^2$ contiguous columns, and estimated values of the resulting column submatrix may be used to estimate the reconstruction matrix.

The training operation may generate a number of directionally interpolated maximum a-priori (MAP) estimations of the image data based on the number of estimated reconstruction matrices (706), and may determine filter coefficients for each of a number of cross-band interpolation filters based at least in part on the MAP estimations of the image data (708). In example implementations, the cross-band interpolation filters may be provided within or coupled to the cross-band interpolation circuit 260 of FIG. 2, and may include a set of first directional cross-band interpolation filters and a set of second directional cross-band interpolation filters. In some aspects, the set of first directional cross-band interpolation filters may be configured to generate a number of first interpolated images based on the captured SI mosaic data, where each of the first directional interpolated images may correspond to a different spectral band of the SI sensor and may be associated with an edge energy along a first direction of the SI mosaic data. The set of second directional cross-band interpolation filters may be configured to generate a number of second interpolated images based on the captured SI mosaic data, where each of the second directional interpolated images may correspond to a different spectral band of the SI sensor and may be associated with an edge energy along a second direction of the SI mosaic data that is orthogonal to the first direction.

The training operation may determine one or more edge classification factors for pixels of the SI sensor based at least in part on the determined filter coefficients (710). In some aspects, a first edge classification factor based on edge energies along the first direction of the SI mosaic data may be used to scale the number of first interpolated images, and a second edge classification factor based on edge energies along the second direction of the SI mosaic data may be used to scale the number of second interpolated images.

The training operation may configure the cross-band interpolation circuit 260 based at least in part on the determined filter coefficients and the determined edge classification factors (712). In some implementations, a set of first filter coefficients may be provided to the first directional cross-band interpolation filters 540, and a set of second filter coefficients may be provided to the second directional cross-band interpolation filters 550 (see also FIG. 5). A first edge classification factor may be provided to the first scaler 560, and a second edge classification factor may be provided to the second scaler 565. In some aspects, the determined filter coefficients and the determined edge classification factors may be stored in the memory 230 of FIG. 2 (e.g., within the data store 231).

After being configured by the training operation, the cross-band interpolation circuit 260 may capture SI mosaic data using the SI sensor (714), and may recover full-resolution spectral data from the captured SI mosaic data (716). In some implementations, the first directional cross-band interpolation filters 540 may process a respective unit block of the SI mosaic data to generate a number of first directionally interpolated images. The first directionally interpolated images may correspond to a first direction of the SI mosaic data, and may be scaled by the first edge classification factor. In a similar manner, the second directional cross-band interpolation filters 550 may process a respective unit block of the SI mosaic data to generate a number of second directionally interpolated images. The second directionally interpolated images may correspond to a second direction of the SI mosaic data, and may be scaled by the second edge classification factor. In some aspects, the first and second directions are orthogonal to one another.

FIG. 8 shows an illustrative flow chart depicting an example operation 800 for estimating a reconstruction matrix having a block circulant structure. The example operation 800 may be one implementation of the estimating operation 704 of FIG. 7. Referring also to FIG. 4, the training operation may select a row submatrix or a column submatrix of the respective reconstruction matrix (802). In some aspects, the row submatrix may be the first $qp^2$ contiguous rows of the respective reconstruction matrix, and the column submatrix may be the first $qp^2$ contiguous columns of the respective reconstruction matrix. The training operation may estimate coefficients of the selected row submatrix or the selected column submatrix (804). In some aspects, the coefficients of the selected row submatrix or the selected column submatrix may be estimated in an offline training operation. The training operation may derive coefficients of the respective reconstruction matrix based on the estimated coefficients of the selected row submatrix or the selected column submatrix (806). In this manner, the respective reconstruction matrix may have a complexity of at most $O(qp^2N^2)$—which is one or more orders of magnitude less than the complexity $O(qN^4)$ of the entire respective reconstruction matrix.

FIG. 9 shows an illustrative flow chart depicting an example operation 900 for recovering full-resolution spectral data from the captured SI mosaic data. The example operation 900 may be one implementation of the recovering operation 716 of FIG. 7. The cross-band interpolation circuit 260 may generate a number of first directional interpolated images corresponding to different spectral bands of the SI sensor based on the captured SI mosaic data (902), and may generate a number of second directional interpolated images corresponding to different spectral bands of the HSI sensor based on the captured SI mosaic data (904). The cross-band interpolation circuit 260 may combine the first directional interpolated images and the second directional interpolated images to generate full-resolution image data (906).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, aspects of the present disclosure have been described with reference to specific implementations thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method, comprising:
   determining a spectral mosaic of a spectral imaging (SI) sensor;
   estimating a number of reconstruction matrices based on the spectral mosaic of the SI sensor;
   generating a number of directionally interpolated maximum a-priori (MAP) estimations of image data based on the number of estimated reconstruction matrices;
   determining filter coefficients for each of a number of cross-band interpolation filters based at least in part on the MAP estimations of the image data;
   determining edge classification factors for pixels of the SI sensor based at least in part on the determined filter coefficients; and
   configuring a cross-band interpolation circuit based at least in part on the determined filter coefficients and the determined edge classification factors.

2. The method of claim 1, wherein determining the edge classification factors is further based on estimated edge energies in orthogonal directions of the image data.

3. The method of claim 1, wherein the spectral mosaic comprises an ordered plurality of pixels arranged as a pixel grid including at least two identical pixel blocks.

4. The method of claim 1, wherein each of the reconstruction matrices has a block circulant structure, and estimating a respective reconstruction matrix comprises:
   selecting a row submatrix of the respective reconstruction matrix;
   estimating coefficients of the selected row submatrix; and
   deriving coefficients of the respective reconstruction matrix based on the estimated coefficients of the selected row submatrix.

5. The method of claim 1, wherein each of the reconstruction matrices has a block circulant structure, and estimating a respective reconstruction matrix comprises:
   selecting a column submatrix of the respective reconstruction matrix;
   estimating coefficients of the selected column submatrix; and
   deriving coefficients of the respective reconstruction matrix based on the estimated coefficients of the selected column submatrix.

6. The method of claim 1, wherein each of the number of cross-band interpolation filters corresponds to a different spectral band of the SI sensor.

7. The method of claim 1, wherein the number of cross-band interpolation filters comprises:
   a set of first directional cross-band interpolation filters configured to generate first interpolated images for different spectral bands of the SI sensor based at least in part on edge energies in a first direction of the image data; and
   a set of second directional cross-band interpolation filters configured to generate second interpolated images for different spectral bands of the SI sensor based at least in part on edge energies in a second direction of the image data that is orthogonal to the first direction.

8. The method of claim 1, further comprising:
   capturing SI mosaic data using the SI sensor; and
   recovering full-resolution spectral data from the captured SI mosaic data using the configured cross-band interpolation circuit.

9. The method of claim 8, wherein the recovering comprises:
   generating a number of first directional interpolated images based on the captured SI mosaic data, each of the first directional interpolated images corresponding to a different spectral band of the SI sensor and associated with an edge energy along a first direction of the SI mosaic data;
   generating a number of second directional interpolated images based on the captured SI mosaic data, each of the second directional interpolated images corresponding to a different spectral band of the SI sensor and associated with an edge energy along a second direction of the SI mosaic data that is orthogonal to the first direction; and
   combining the first directional interpolated images and the second directional interpolated images to generate full-resolution image data.

10. The method of claim 1, further comprising:
    reconfiguring the cross-band interpolation circuit for another SI sensor having a different spectral mosaic than the SI sensor.

11. A device, comprising:
    memory configured to store data; and
    a processor in communication with the memory, the processor being configured to:
      determine a spectral mosaic of a spectral imaging (SI) sensor;
      estimate a number of reconstruction matrices based on the spectral mosaic of the SI sensor;
      generate a number of directionally interpolated maximum a-priori (MAP) estimations of image data based on the number of estimated reconstruction matrices;
      determine filter coefficients for each of a number of cross-band interpolation filters based at least in part on the MAP estimations of the image data;
      determine edge classification factors for pixels of the SI sensor based at least in part on the determined filter coefficients; and
      configure a cross-band interpolation circuit based at least in part on the determined filter coefficients and the determined edge classification factors.

12. The device of claim 11, wherein determination of the edge classification factors is further based on estimated edge energies in orthogonal directions of the image data.

13. The device of claim 11, wherein each of the reconstruction matrices has a block circulant structure, and the processor is configured to estimate the respective reconstruction matrix by:

selecting a row submatrix of the respective reconstruction matrix;

estimating coefficients of the selected row submatrix; and deriving coefficients of the respective reconstruction matrix based on the estimated coefficients of the selected row submatrix.

14. The device of claim 11, wherein each of the reconstruction matrices has a block circulant structure, and the processor is configured to estimate the respective reconstruction matrix by:

selecting a column submatrix of the respective reconstruction matrix;

estimating coefficients of the column submatrix; and deriving coefficients of the respective reconstruction matrix based on the estimated coefficients of the selected column submatrix.

15. The device of claim 11, wherein the number of cross-band interpolation filters comprises:

a set of first directional cross-band interpolation filters configured to generate first interpolated images for different spectral bands of the SI sensor based at least in part on edge energies in a first direction of the image data; and a set of second directional cross-band interpolation filters configured to generate second interpolated images for different spectral bands of the SI sensor based at least in part on edge energies in a second direction of the image data that is orthogonal to the first direction.

16. The device of claim 11, wherein the processor is further configured to:

capture SI mosaic data using the HSI sensor; and recover full-resolution spectral data from the captured SI mosaic data.

17. The device of claim 16, wherein the processor is configured to recover the full-resolution spectral data by:

generating a number of first directional interpolated images based on the captured SI mosaic data, each of the first directional interpolated images corresponding to a different spectral band of the SI sensor and associated with an edge energy along a first direction of the SI mosaic data;

generating a number of second directional interpolated images based on the captured SI mosaic data, each of the second directional interpolated images corresponding to a different spectral band of the SI sensor and associated with an edge energy along a second direction of the SI mosaic data that is orthogonal to the first direction; and combining the first directional interpolated images and the second directional interpolated images to generate full-resolution image data.

18. The device of claim 11, wherein the processor is further configured to:

reconfigure the cross-band interpolation circuit for another HSI sensor having a different spectral mosaic than the SI sensor.

19. A device, comprising:

means for determining a spectral mosaic of a spectral imaging (SI) sensor;

means for estimating a number of reconstruction matrices based on the spectral mosaic of the SI sensor;

means for generating a number of directionally interpolated maximum a-priori (MAP) estimations of image data based on the number of estimated reconstruction matrices;

means for determining filter coefficients for each of a number of cross-band interpolation filters based at least in part on the MAP estimations of the image data;

means for determining edge classification factors for pixels of the SI sensor based at least in part on the determined filter coefficients; and means for configuring a cross-band interpolation circuit based at least in part on the determined filter coefficients and the determined edge classification factors.

20. The device of claim 19, wherein the edge classification factors are further based on estimated edge energies in orthogonal directions of the image data.

21. The device of claim 19, wherein each of the reconstruction matrices has a block circulant structure, and the means for estimating a respective reconstruction matrix is to:

select a row submatrix of the respective reconstruction matrix;

estimate coefficients of the selected row submatrix; and derive coefficients of the respective reconstruction matrix based on the estimated coefficients of the selected row submatrix.

22. The device of claim 19, wherein each of the reconstruction matrices has a block circulant structure, and the means for estimating a respective reconstruction matrix is to:

select a column submatrix of the respective reconstruction matrix;

estimate coefficients of the selected column submatrix; and derive coefficients of the respective reconstruction matrix based on the estimated coefficients of the selected column submatrix.

23. The device of claim 19, wherein the number of cross-band interpolation filters comprises:

a set of first directional cross-band interpolation filters configured to generate first interpolated images for different spectral bands of the SI sensor based at least in part on edge energies in a first direction of the image data; and a set of second directional cross-band interpolation filters configured to generate second interpolated images for different spectral bands of the SI sensor based at least in part on edge energies in a second direction of the image data that is orthogonal to the first direction.

24. The device of claim 19, further comprising:

means for capturing SI mosaic data using the SI sensor; and means for recovering full-resolution spectral data from the captured SI mosaic data.

25. The device of claim 24, wherein the means for recovering is to:

generate a number of first directional interpolated images based on the captured SI mosaic data, each of the first directional interpolated images corresponding to a different spectral band of the SI sensor and associated with an edge energy along a first direction of the SI mosaic data;

generate a number of second directional interpolated images based on the captured SI mosaic data, each of the second directional interpolated images corresponding to a different spectral band of the SI sensor and associated with an edge energy along a second direction of the SI mosaic data that is orthogonal to the first direction; and combine the first directional interpolated images and the second directional interpolated images to generate full-resolution image data.

26. The device of claim 19, further comprising:

means for reconfiguring the cross-band interpolation circuit for another SI sensor having a different spectral mosaic than the SI sensor.

27. A device, comprising:

a spectral imaging (SI) sensor configured to capture SI mosaic data;

a set of first directional cross-band interpolation filters coupled to the SI sensor and configured to generate a number of first interpolated images based on the captured SI mosaic data, each of the first directional interpolated images corresponding to a different spectral band of the SI sensor and associated with an edge energy along a first direction of the SI mosaic data;

a set of second directional cross-band interpolation filters coupled to the SI sensor and configured to generate a number of second directional interpolated images based on the captured SI mosaic data, each of the second directional interpolated images corresponding to a different spectral band of the SI sensor and associated with an edge energy along a second direction of the HSI mosaic data that is orthogonal to the first direction; and a first scaler configured to scale the number of first interpolated images based on a first edge classification factor;

a second scaler configured to scale the number of second interpolated images based on a second edge classification factor; and a summing node configured to generate full-resolution image data based on a combination of the scaled first interpolated images and the scaled second interpolated images.

28. The device of claim 27, further comprising an edge classifier coupled to the SI sensor, the edge classifier including at least:

a number of first directional filters configured to filter unit blocks of the SI mosaic data based on edge energies along the first direction;

a first summer configured to generate a first sum of the absolute values of the unit blocks filtered by the first directional filters;

a number of second directional filters configured to filter unit blocks of the SI mosaic data based on edge energies along the second direction;

a second summer configured to generate a second sum of the absolute values of the unit blocks filtered by the second directional filters; and logic configured to generate a respective edge classification factor based on a combination of the first and second sums.

29. The device of claim 27, further comprising training logic configured to:

generate, for the set of first directional cross-band interpolation filters, a number of first filter coefficients based at least in part on directionally interpolated maximum a-priori (MAP) estimations of image data in the first direction; and generate, for the set of second directional cross-band interpolation filters, a number of second filter coefficients based at least in part on directionally interpolated MAP estimations of image data in the second direction.

30. The device of claim 29, wherein the first edge classification factor is based at least in part on the number of first filter coefficients, and the second edge classification factor is based at least in part on the number of second filter coefficients.

* * * * *